(12) United States Patent
Garcia Azorero et al.

(10) Patent No.: US 11,191,088 B2
(45) Date of Patent: Nov. 30, 2021

(54) TECHNIQUE FOR USER PLANE FUNCTION ALLOCATION

(71) Applicant: Telefonaktiebolaget LM Ericsson (publ), Stockholm (SE)

(72) Inventors: Fuencisla Garcia Azorero, Madrid (ES); Susana Fernandez Alonso, Madrid (ES); Victor Ferraro Esparza, Valencia (ES); Angel Navas Cornejo, Leganes (ES); Ignacio Rivas Molina, Madrid (ES)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 216 days.

(21) Appl. No.: 16/609,778

(22) PCT Filed: Jun. 6, 2017

(86) PCT No.: PCT/EP2017/063644
§ 371 (c)(1),
(2) Date: Oct. 31, 2019

(87) PCT Pub. No.: WO2018/224126
PCT Pub. Date: Dec. 13, 2018

(65) Prior Publication Data
US 2020/0068587 A1 Feb. 27, 2020

(51) Int. Cl.
*H04W 72/12* (2009.01)
*H04W 80/08* (2009.01)
(Continued)

(52) U.S. Cl.
CPC ....... *H04W 72/10* (2013.01); *H04W 72/0406* (2013.01); *H04W 76/10* (2018.02); *H04W 36/30* (2013.01)

(58) Field of Classification Search
CPC . H04W 72/10; H04W 80/08; H04W 72/0443; H04W 72/06; H04W 36/385
See application file for complete search history.

(56) References Cited

U.S. PATENT DOCUMENTS

| | | | |
|---|---|---|---|
| 7,899,451 B2 * | 3/2011 | Hu | H04L 12/189 455/422.1 |
| 2002/0150092 A1 * | 10/2002 | Bontempi | H04W 76/45 370/389 |

(Continued)

FOREIGN PATENT DOCUMENTS

| | | |
|---|---|---|
| EP | 3086513 A1 | 10/2016 |
| WO | 2017009525 A1 | 1/2017 |

OTHER PUBLICATIONS

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.3.1, Mar. 1, 2017, pp. 1-97, 3GPP.

(Continued)

*Primary Examiner* — Diane L Lo
*Assistant Examiner* — Abusayeed M Haque
(74) *Attorney, Agent, or Firm* — Coats + Bennett, PLLC

(57) ABSTRACT

An apparatus for user plane function, UPF, allocation is described. The UPF is configured to provide a Protocol Data Unit, PDU, connectivity service between a terminal device and a data network on a user plane, and the allocation is based on control information associated with an individual logical PDU entity. The control information defines priority information indicative of a priority of the PDU entity relative to other PDU entities and pre-emption information indicative of at least one of whether the PDU entity is capable of being pre-emptively allocated to a UPF over other PDU entities served by that UPF, and whether the PDU (Continued)

entity when served by a UPF is vulnerable to being reallocated for pre-emptively allocating other PDU entities to that UPF. The apparatus is configured to detect an event that requires UPF allocation to a first PDU entity, to select a first UPF, wherein the first UPF is serving one or more second PDU entities, and to determine, for the selected UPF, insufficient resources for serving the first PDU entity. The apparatus is also configured to perform, responsive to determining the insufficient resources of the selected UPF, an evaluation of first priority information associated with the first PDU entity relative to second priority information associated with the one or more second PDU entities and at least one of first pre-emption information associated with the first PDU entity and second pre-emption information associated with the one or more second PDU entities. The apparatus is further configured to trigger, dependent on the result of the evaluation, allocation of the first PDU entity to either the first UPF or a second UPF.

20 Claims, 14 Drawing Sheets

(51) Int. Cl.
*H04W 72/10* (2009.01)
*H04W 76/10* (2018.01)
*H04W 72/04* (2009.01)
*H04W 36/30* (2009.01)

(56) References Cited

U.S. PATENT DOCUMENTS

| | | | | |
|---|---|---|---|---|
| 2003/0223381 | A1* | 12/2003 | Schroderus | H04L 29/06027 370/285 |
| 2003/0231639 | A1* | 12/2003 | Mikkola | H04L 65/103 370/401 |
| 2004/0024902 | A1* | 2/2004 | Mikkola | H04L 29/06027 709/238 |
| 2005/0054361 | A1* | 3/2005 | Turcanu | H04W 12/06 455/518 |
| 2009/0285225 | A1* | 11/2009 | Dahod | H04L 47/10 370/401 |
| 2017/0332282 | A1* | 11/2017 | Dao | H04W 72/087 |
| 2018/0077618 | A1* | 3/2018 | Lee | H04W 40/22 |
| 2019/0037629 | A1* | 1/2019 | Ryu | H04W 8/08 |
| 2019/0342874 | A1* | 11/2019 | Davydov | H04L 5/0094 |
| 2020/0329450 | A1* | 10/2020 | Youn | H04W 8/20 |

OTHER PUBLICATIONS

3rd Generation Partnership Project, "3rd Generation Partnership Project; Technical Specification Group Core Network and Terminals; Support of Dual Tone Multi-Frequency (DTMF) Signalling (Release 14)", Technical Specification, 3GPP TS 23.014 V14.0.0, Mar. 1, 2017, pp. 1-12, 3GPP.

3rd Generation Partnership Project, "3rd Generation Partnership Project; Technical Specification Group Services and System Aspects; Policy and Charging Control Architecture (Release 14)", Technical Specification, 3GPP TS 23.203 V14.0.0, Jun. 1, 2016, pp. 1-245, 3GPP.

3rd Generation Partnership Project, "3rd Generation Partnership Project; Technical Specification Group Services and System Aspects; Procedures for the 5G System; Stage 2 (Release 15)", Technical Specification, 3GPP TS 23.502 V0.2.0, Feb. 1, 2017, pp. 1-71, 3GPP.

3rd Generation Partnership Project, "3rd Generation Partnership Project; Technical Specification Group Services and System Aspects; System Architecture for the 5G System; Stage 2 (Release 15)", Technical Specification, 3GPP TS 23.501 V0.4.0, Apr. 1, 2017, pp. 1-124, 3GPP.

* cited by examiner

| Type of User | Service – Data Network | Control (Traffic Routing Priority) Info | | | SMF: UPF selection Action |
|---|---|---|---|---|---|
| | | Preferred UPF | Priority info | Pre-emption info | |
| VIP | live stadium – StadiumDN | UPF1 | 1 | Preemption capability YES | Identify preferred UPF -> UPF1. If preferred UPF (UPF1) risks service availability, allocate UPF1 and relocate SDFs with lower priority level and with no preemption vulnerability to UPF2. |
| non-VIP | live stadium - StadiumDN | UPF1, UPF2 | 2 | Preemption vulnerability NO | Identify preferred UPF -> UPF1. If preferred UPF (UPF1) guarantees service availability for ongoing flows, allocate UPF1. If preferred UPF risks service availability, allocate UPF2 |

FIG. 11

| Type of User | Data Network | Control (Traffic Routing Priority) Info | | | SMF: UPF selection Action |
|---|---|---|---|---|---|
| | | Preferred UPF | Priority Info | Pre-emption Info | |
| VIP | StadiumDN | UPF3 | 1 | Capability YES<br><br>Vulnerability YES | Identify preferred UPF -> UPF3<br><br>Allocate UPF3 priority level indicates that PDU session flows of VIP users have admission granted. Pre-emption capability indicates that VIP PDU session flows can pre-empt non-VIP users PDU session flows |
| non-VIP | StadiumDN | UPF3 | N | Pre-emption vulnerability NO | Identify preferred UPF -> UPF3. |

FIG. 13

| Type of User | Service – in StadiumDN | Control (Traffic Routing Priority) Info | | | SMF: UPF selection Action |
|---|---|---|---|---|---|
| | | Preferred UPF | Priority Info | Pre-emption info | |
| VIP | live Stadium (high serv req service) | UPF1 | 1 | Pre-emption capability YES | Identify preferred UPF for live Stadium-> UPF1. Priority level indicates SMF shall meet UPF1 in UPF selection for live stadium.service. Since 'live Stadium' is the service with the highest service requirements, the branching function is allocated to UPF1. |
| non-VIP | live Stadium (high serv req service) | UPF1, UPF2 | 2 | Pre-emption vulnerability NO | Identify preferred UPF for live Stadium-> UPF1. Priority indicates SMF meets UPF1 if capacity available, otherwise SMF selects UPF2 |
| VIP | Stadium web info (low serv req service) | - | - | - | Identify preferred UPF for live Stadium web info-> UPF3. The lack of SDF information (or the lack of TRP information at SDF level ) indicates that SMF shall meet UPF3 in UPF selection for stadium web info.service according to the TRP information included at PDU session level. |
| Non-VIP | Stadium web info (low serv req service) | - | - | - | Identify preferred UPF for live Stadium web info-> UPF3. The lack of SDF information (or the lack of TRP information at SDF level) indicates that SMF shall meet UPF3 in UPF selection for stadium web info.service according to the TRP information included at PDU session level. Note that VIP users dataflows will preempt Non-VIP users dataflows |

FIG. 14

TECHNIQUE FOR USER PLANE FUNCTION ALLOCATION

TECHNICAL FIELD

The present disclosure generally relates to the allocation of user plane functions. Such user plane functions provide protocol data unit connectivity services between terminal devices and data networks.

BACKGROUND

Modern communication systems such as those standardized by the 3$^{rd}$ Generation Partnership Project, 3GPP, comprise a core network with packet data network gateways, PGWs, that provide Internet Protocol-, IP-, based access to data networks. The functionalities of such PGWs are split between a control plane and a user plane. The PGW control plane functionality is also referred to as PGW-C, and the PGW user plane functionality is called PGW-U.

The PGW-Us act as simple and generic forwarding and anchoring nodes for logical entities (e.g., sessions or data flows) that comprise or define a sequence of associated protocol data units, PDUs. As such, the PGW-Us provide PDU connectivity services between terminal devices and data networks (e.g., the Internet). PGW-Us may also perform other actions, such as service classification, service enforcement, and reporting.

The PGW-Cs are in charge of allocating an individual PGW-U to an individual logical PDU entity based on predefined PGW-U selection criteria (e.g., based on dynamic loads of the PWG-Us, locations of the PWG-Us, and so on). The PGW-Cs are also responsible for configuring a particular PGW-U that was selected to be allocated to a particular logical PDU entity. The corresponding configuration can define the traffic detection and forwarding behaviour of that PGW-U, or other aspects.

In upcoming communication systems such as the 5$^{th}$ Generation, 5G, systems currently standardized by 3GPP, the split architecture of the PGWs is intended to be maintained to allow independent scalability, evolution and flexible deployments (see, e.g., 3GPP TS 23.501 V0.4.0 (April 2017), Sect. 4.1 General concepts). In the corresponding 3GPP specifications, the PGW user plane functionality is also called user plane function, UPF.

UPF selection (including UPF re-selection) is performed on the control plane by a so-called session management function, SMF (see 3GPP TS 23.501 V0.4.0 (April 2017), Sect. 6.3.3 for more details). It has been found that the selection principles defined in 3GPP TS 23.501 V0.4.0 (April 2017), Sect. 6.3.3 do not efficiently address the complexities that arise in many situations in which UPFs have to be allocated to logical PDU entities (e.g., PDU sessions or Service Data Flows, SDFs).

For example, there exist situations in which a particular UPF faces capacity problems that have a negative effect on the logical PDU entities currently served by that UPF (e.g., in terms of increased latency or reduced bandwidth of the underlying connectivity service). In such situations it would be helpful if the SMF could properly decide about allocating individual logical PDU entities to another UPF. In other situations, a framework would be helpful that permits to assign dedicated UPF resources to specific services or specific subscribers or subscriber groups (e.g., to achieve service independence and isolation).

It is noted that mere Quality of Service (QoS) profile parameters as defined in a particular subscription do not always form a proper basis for coping with such situations. For example, a gaming service and a remote surgery service could have the same QoS profile in regard of latency and bandwidth requirements, but have a different vulnerability.

SUMMARY

There is a need for a technique that permits an efficient allocation of UPFs to logical PDU entities.

According to a first aspect, an apparatus for UPF allocation, is presented, wherein the UPF is configured to provide a PDU connectivity service between a terminal device and a data network on a user plane. The allocation is based on control information associated with an individual logical PDU entity and defining priority information indicative of a priority of the PDU entity relative to other PDU entities and pre-emption information. The pre-emption information is indicative of at least one of whether the PDU entity is capable of being pre-emptively allocated to a UPF over other PDU entities served by that UPF and whether the PDU entity when served by a UPF is vulnerable to being re-allocated for pre-emptively allocating other PDU entities to that UPF. The apparatus according to the first aspect is configured to detect an event that requires UPF allocation to a first PDU entity, to select a first UPF, wherein the first UPF is serving one or more second PDU entities, to determine, for the selected first UPF, insufficient resources for serving the first PDU entity, and to perform, responsive to determining the insufficient resources of the selected UPF, an evaluation of first priority information associated with the first PDU entity relative to second priority information associated with the one or more second PDU entities and of at least one of first pre-emption information associated with the first PDU entity and second pre-emption information associated with the one or more second PDU entities. The apparatus according to the first aspect is further configured to trigger, dependent on the result of the evaluation, allocation of the first PDU entity to either the first UPF or a second UPF.

The allocated UPF will provide connectivity services in regard to the first PFU entity (e.g., perform traffic forwarding and/or to act as a traffic anchor for the first PDU entity). In general, the triggering step may lead to an actual or a conditional allocation of the first PDU entity to a specific UPF. The conditional allocation may involve a further iteration of the step sequence in regard to the first PDU entity, but based on the second UPF. After an actual allocation of the first PDU entity to a specific UPF, that UPF actually serve the first PDU entity. To this end, the UPF may be provided with additional information that is required by the UPF for serving the first PDU entity. Therefore, triggering allocation of a PDU entity to a UPF, and vice versa, may initially only establish a logical association therebetween.

In general, a UPF may be realized as a PGW that provides data network access on a user plane. The data network access may be based on the Internet Protocol, IP. The UPF may belong to the core network of a 5G communication system. As an example, the UPF may be part of a communication system as defined in 3GPP TS 23.501 V0.4.0 or any later version thereof.

The logical PDU entity may define a sequence of associated PDUs. The PDUs may be associated in a session context, in a data flow context, or any other logical context. Each logical PDU entity may be associated with two endpoints, namely a terminal device at one end and a data network entity at the other end. The endpoints may be defined by IP addresses or other addresses or identifiers.

The priority information may take any form, such as a set of one or more parameters. As an example, the priority information may be a number within a predefined range of numbers. If, for example, the range extends from x to y, any number between x and y may be assigned as priority information. Depending on preferences, a lower number may indicate a higher priority, or vice versa.

The pre-emption information may take any form, such as a set of one or more parameters. For example, the pre-emption information may be represented by a first binary parameter (PDU entity capable: yes/no) and/or a second binary parameter (PDU entity vulnerable: yes/no). In one implementation, the first binary parameter and the second binary parameters are each configured as a flag or similar data structure.

In case the selected first UPF serves multiple second PDU entities, the evaluation step may be performed in regard to the first PDU entity and multiple, or all, of the second PDU entities. The evaluation step may in such a case be aborted when it is found that one of the second PDU entities has a lower priority than the first PDU entity and is not vulnerable to being re-allocated to another (e.g., the second) UPF. The first PDU entity may in such a case be allocated to the first UPF.

In case allocation of the first PDU entity to a second UPF is triggered, this triggering may be regarded as a (further) event that requires UPF allocation to the first PDU entity. Responsive to detection of that event, the second UPF may be selected, and the further steps explained above may be repeated in a next iteration. In a similar manner, the event that triggers the above steps, including the selection of the first UPF, may have been the result of a preceding iteration.

The apparatus may be configured to trigger allocation of the first PDU entity to the second UPF when at least one of the following conditions holds: (1) the evaluation of the first and second priority information yields that the first PDU entity has a lower priority than the one or more second PDU entities; (2) the evaluation of the first pre-emption information yields that the first PDU entity is not capable of being pre-emptively allocated over other PDU entities; and (3) the evaluation of the second pre-emption information yields that the one or more second PDU entities are vulnerable to being re-allocated. In some implementations, two (e.g., (1) & (2), (1) & (3), (2) & (3)) or all three conditions have to hold so that allocation of the first PDU entity to the second UPF will be triggered.

Moreover, the apparatus may be configured to trigger allocation of at least one of the one or more second PDU entities to the second or a third UPF when the evaluation yields that the first PDU entity is to be allocated to the first UPF. Resources of the first UPF may thus be freed so that the first UPF can serve the first PDU entity.

The apparatus may be configured to trigger allocation of the first PDU entity to the first UPF when at least one of the following conditions holds: (1) the evaluation of the first and second priority information yields that the first PDU entity has a higher priority than the one or more second PDU entities; (2) the evaluation of the first pre-emption information yields that the first PDU entity is capable of being pre-emptively allocated over other PDU entities; and (3) the evaluation of the second pre-emption information yields that the one or more second PDU entities are not vulnerable to being re-allocated. In some implementations, two (e.g., (1) & (2), (1) & (3), (2) & (3)) or all three conditions have to hold so that allocation of the first PDU entity to the first UPF will be triggered.

The control information may be associated with the respective PDU entity via a subscription. As an example, the first PDU entity may be associated with a terminal device, and the terminal device may be associated with a subscription that defines or permits to derive the control information associated with the PDU entity. As an example, parameters defined in a subscription profile may be parsed (e.g., automatically or semi-automatically) to derive the control information for all PDU entities associated with the subscription or a particular PDU entity associated with the subscription. The control information may be defined statically (e.g., for being permanently stored as a subscription profile) or dynamically (e.g., depending on the nature of a particular service associated with the first PDU entity).

The control information associated with the first PDU entity may further define one or more preferred UPFs including the first UPF. In such a case, the apparatus may be configured to select the first UPF based on the one or more preferred UPFs defined in the control information associated with the first PDU entity. As an example, the control information may define an ordered list of two or more UPFs. One or more selection rules may be defined that permit to derive the first UPF from the ordered list. Based on such selection rules, initially the highest ranked UPF may be selected as the first UPF. Moreover, the next highest ranked UPF may be selected as the first UPF in case the evaluation yields that first PDU entity shall not or cannot be allocated to the highest ranked UPF, and so on.

The control information associated with the first PDU entity may be devoid of a definition of one or more preferred UPFs. In such a case, the apparatus may be configured to select the first UPF based on at least one of the following parameters: UPF load, UPF capacity, UPF location, UPF capability, PDU entity type, PDU entity mode, data network name, subscription profile associated with the terminal device, and data routing destination. Of course, one or more of these parameters can also be taken into account in cases in which the control information associated with the first PDU entity does include a definition of one or more preferred UPFs. In such a case, the first UPF may be selected taking into account both the one or more preferred UPFs and one or more of the above parameters.

The control information may further define a notification requirement when, in case of a re-allocation of a PDU entity from a serving UPF to another UPF, one or more service-related parameters associated with that PDU entity can no longer be fulfilled. The one or more service-related parameters may, for example, relate to latency and/or bandwidth. The parameters may be defined in a subscription associated with the terminal device that terminates the PDU entity. Such service-related parameters include, for example, one or more Quality of Service (QoS) parameters and/or one or more Quality of Experience (QoE) parameters The detected event may be indicative of a need for a UPF de-allocation of the first PDU entity from a serving fourth UPF to a fifth UPF. The need for a de-allocation may be the result of detecting that the fourth UPF cannot or no longer fulfil one or more service-related parameters. One or more such parameters may be defined in a subscription associated with the first PDU entity (e.g., as explained above). The fifth UPF may be identical to one of the first UPF and the second UPF.

The apparatus may be configured to send a notification message in case the allocation to the fifth UPF results in one or more service-related parameters associated with the first PDU entity no longer being fulfilled. As explained above, the service-related parameters may comprise one or more QoS parameters and/or one or more QoE parameters.

The notification message may be sent to a unified data management, UDM, function over one of an N10 interface and an Nudm service interface. Additionally, or in the alternative, the notification message may be sent to a policy control function, PCF, over one of an N7 interface and an Npcf service interface. The UDM and PCF as well as the related interfaces may conform to TS 23.501 V0.4.0 or any later version thereof.

The need for the UPF de-allocation may be the result of an earlier evaluation resulting in the apparatus having to trigger a de-allocation of the first PDU entity from the fourth UPF so that the fourth UPF can be allocated to a third PDU entity. The method according the first aspect may thus be performed in an iterative manner.

The need for the UPF de-allocation may generally be related to one or more of mobility of the terminal device associated with the first PDU entity, a change of the control information associated with the first PDU entity, a change of a packet error rate associated with the first PDU entity, a change of latency requirements for the first PDU entity, and a change of bandwidth requirements for the first PDU entity.

The detected event may be indicative of establishment of the first PDU entity. For example, the first PDU entity may newly be established, so that an initial UPF allocation is required.

The apparatus may further be configured to receive the control information associated with the first PDU entity. In one variant, the control information is received from a PCF over one of an N7 interface and an Npcf service interface. In another variant, the control information is received from a UDM function over one of an N10 interface and an Nudm service interface. As explained above, the UDM and PCF as well as the related interfaces may conform to TS 23.501 V0.4.0 or any later version thereof.

A PDU entity may be one of a PDU session and a service data flow, SDF, associated with a PDU session. One PDU session may comprise multiple SDFs. The control information associated with the first PDU entity may be received as part of one of a service data flow, SDF, description and of PDU session information.

The apparatus may be configured to implement the UPF allocation as part of a session management function, SMF. The SMF may belong to a $5^{th}$ Generation network as currently standardized by 3GPP. The SMF may in particular conform to TS 23.501 V0.4.0 or any later version thereof.

According to a second aspect, an apparatus is provided for controlling UPF allocation, wherein the UPF is configured to provide a PDU connectivity service between a terminal device and a data network on a user plane, and wherein the allocation is based on control information associated with an individual logical PDU entity. The control information defines priority information indicative of a priority of the PDU entity relative to other PDU entities and pre-emption information. The pre-emption information is indicative of at least one of whether the PDU entity is capable of being pre-emptively allocated to a UPF over other PDU entities served by that UP, and whether the PDU entity when served by a UPF is vulnerable to being re-allocated for pre-emptively allocating other PDU entities to that UPF. The apparatus is configured to detect an event that requires transmission of control information associated with a PDU entity to facilitate an allocation of the PDU entity to a UPF, to obtain the control information associated with the PDU entity, and to transmit the control information for PDU entity allocation.

The apparatus according to the second aspect may be configured to implement the UPF allocation control as part of a PCF, and to transmit the control information over one of an N7 interface and an Npcf service interface to a session management function, SMF. The apparatus according to the second aspect may also be configured to implement the UPF allocation control as part of a UDM function and to transmit the control information over one of an N10 interface and an Nudm service interface to an SMF.

The event that requires transmission of control information for the PDU entity may be one of an establishment of the PDU entity, a modification of control information associated with the PDU entity, and a reception of a notification from an application function, AF. The AF may conform to TS 23.501 V0.4.0 or any later version thereof.

Also provided is a UPF allocation system comprising the apparatus according to the first aspect and the apparatus according to the second aspect.

According to a third aspect, a method for UPF allocation is provided, wherein the UPF is configured to provide a PDU connectivity service between a terminal device and a data network on a user plane, and wherein the allocation is based on control information associated with an individual logical PDU entity and defining priority information indicative of a priority of the PDU entity relative to other PDU entities and pre-emption information. The pre-emption information is indicative of at least one of whether the PDU entity is capable of being pre-emptively allocated to a UPF over other PDU entities served by that UPF, and whether the PDU entity when served by a UPF is vulnerable to being re-allocated for pre-emptively allocating other PDU entities to that UPF. The method comprises detecting an event that requires UPF allocation to a first PDU entity, selecting a first UPF, wherein the first UPF is serving one or more second PDU entities, and determining, for the selected first UPF, insufficient resources for serving the first PDU entity. The method also comprises performing, responsive to determining the insufficient resources of the selected UPF, an evaluation of first priority information associated with the first PDU entity relative to second priority information associated with the one or more second PDU entities and at least one of first pre-emption information associated with the first PDU entity and second pre-emption information associated with the one or more second PDU entities. The method further comprises triggering, dependent on the result of the evaluation, allocation of the first PDU entity to either the first UPF or a second UPF.

The method according to the third aspect may comprise one or more further steps as described herein. The method may be performed by an apparatus according to the first aspect described above and hereinafter.

Still further, according to a fourth aspect, a method for controlling UPF allocation is presented, wherein the UPF is configured to provide a PDU connectivity service between a terminal device and a data network on a user plane, and wherein the allocation is based on control information associated with an individual logical PDU entity and defining priority information indicative of a priority of the PDU entity relative to other PDU entities and pre-emption information. The pre-emption information is indicative of at least one of whether the PDU entity is capable of being pre-emptively allocated to a UPF over other PDU entities served by that UPF, and whether the PDU entity when served by a UPF is vulnerable to being re-allocated for pre-emptively allocating other PDU entities to that UPF. The method comprises detecting an event that requires transmission of control information associated with a PDU entity to facilitate an allocation of the PDU entity to a UPF, obtaining the control information associated with the PDU entity, and transmitting the control information for PDU entity allocation.

The method according to the fourth aspect may comprise one or more further steps as described herein. The method may be performed by an apparatus according to the second aspect described above and hereinafter.

Also provided is computer program product comprising program code portions for performing the steps of any of the methods presented herein when the computer program product is executed on one or more processing devices. The computer program product may be stored on a computer readable recording medium, such as a semiconductor memory, CD-ROM, DVD-ROM, and so on.

BRIEF DESCRIPTION OF THE DRAWINGS

Further details of the present disclosure will become apparent from the following description of embodiments and from the drawings, wherein

FIG. 11 is a table illustrating embodiments of traffic routing priority information and user plane function selection strategies;

FIG. 13 is another table illustrating embodiments of traffic routing priority information and user plane function selection strategies; and FIG. 14 is a still further table illustrating embodiments of traffic routing priority information and user plane function selection strategies.

DETAILED DESCRIPTION

In the following description, for purposes of explanation and not limitation, specific details are set forth, such as specific network systems and specific messaging procedures, in order to provide a thorough understanding of the techniques discussed herein. It will be apparent to one skilled in the art that these techniques may be practiced in other embodiments that depart from the specific details described herein. For example, while some of the following embodiments will exemplarily be described in the context of 5G communication networks and certain components thereof, it will be appreciated that the technique presented herein is not limited to such an implementation.

Those skilled in the art will further appreciate that the services, functions, steps and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced Reduced Instruction Set Computer (RISC) Machine (ARM).

It will also be appreciated that, while the following embodiments are primarily described in the context of methods and devices, the present disclosure may also be embodied in a computer program product as well as in a system comprising one or more processors and one or more memories coupled to the one or more processors, wherein the one or more memories are encoded with one or more programs that perform the services, functions, steps and implement the modules disclosed herein when executed on the one or more processors.

Figure 1:
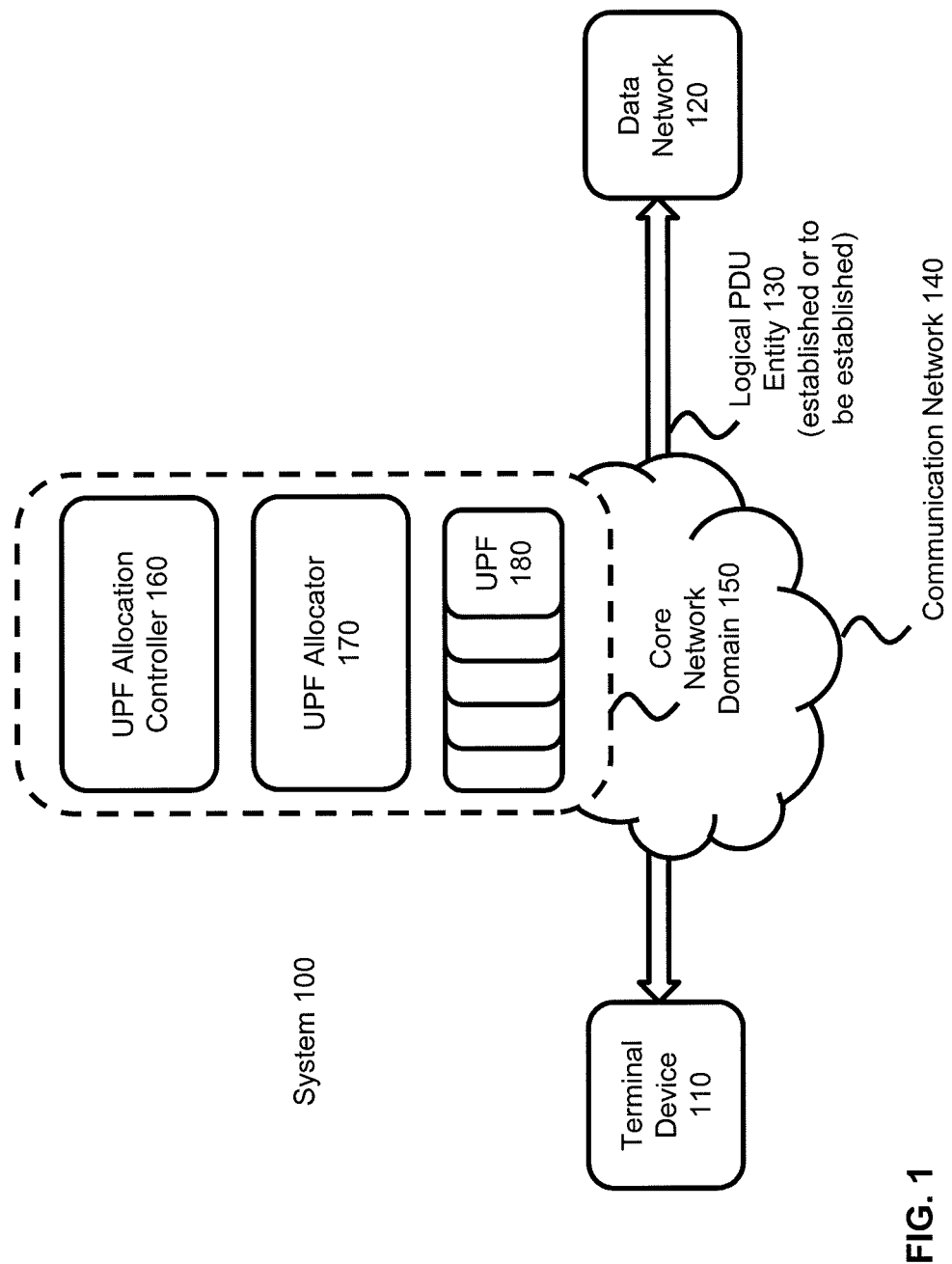
FIG. 1 shows a block diagram schematically illustrating an embodiment of a system for user plane function allocation.

FIG. 1 shows an embodiment of a system 100 in which the technique proposed herein may be implemented.

As illustrated in FIG. 1, the system 100 comprises a terminal device 110 as well as a data network 120, such as the Internet. A logical PDU entity 130 is established, or will be established, between the terminal device 110 and the data network 120. As is such, the terminal device 110 and the data network 120 constitute endpoints of the PDU entity 130. The logical PDU entity 130 may be a session providing a specific service, an SDF proving a specific service, or a combination thereof. Specifically, a particular session may comprise multiple SDFs.

The terminal device 110 and the data network 120 are connected via a communication network 140. As shown in FIG. 1, the PDU entity 130 stretches, or will stretch, over that communication network 140, meaning that the PDU entity 130 makes use of communication resources provided by the communication network 140. The communication network 140 may comprise one or more network domains, such as a core network domain 150 illustrated in FIG. 1. The communication network 140 may additionally comprise an access network domain (not shown in FIG. 1) that permits the terminal device 110 to connect to the communication network 140. The access network domain may in particular provide wireless network access.

The core network domain 150 comprises an UPF allocation controller 160, an UPF allocator 170 as well multiple UPFs 180. It will be appreciated that the core network domain 150 will typically comprise additional components not illustrated in FIG. 1. In FIG. 1, the UPF allocation controller 160 and the UPF allocator 170 are illustrated as separate functionalities. In other embodiments the UPF allocation controller 160 and the UPF allocator 170 may be integrated into a single functionality.

The UPF controller 160 is configured to control the operations of the UPF allocator 170. The UPF allocator 170, in turn, is configured to perform an allocation between an individual PDU entity, such as the PDU entity 130 illustrated in FIG. 1, and an individual UPF, such as one of the UPFs 180 illustrated in FIG. 1. Each of the UPFs 180 is configured to provide a PDU connectivity service between terminal devices (such as the terminal device 110 of FIG. 1) and data networks (such as the data network 120 of FIG. 1). Such connectivity services may comprise traffic forwarding and traffic anchoring for the PDU entity 130.

Figure 2:
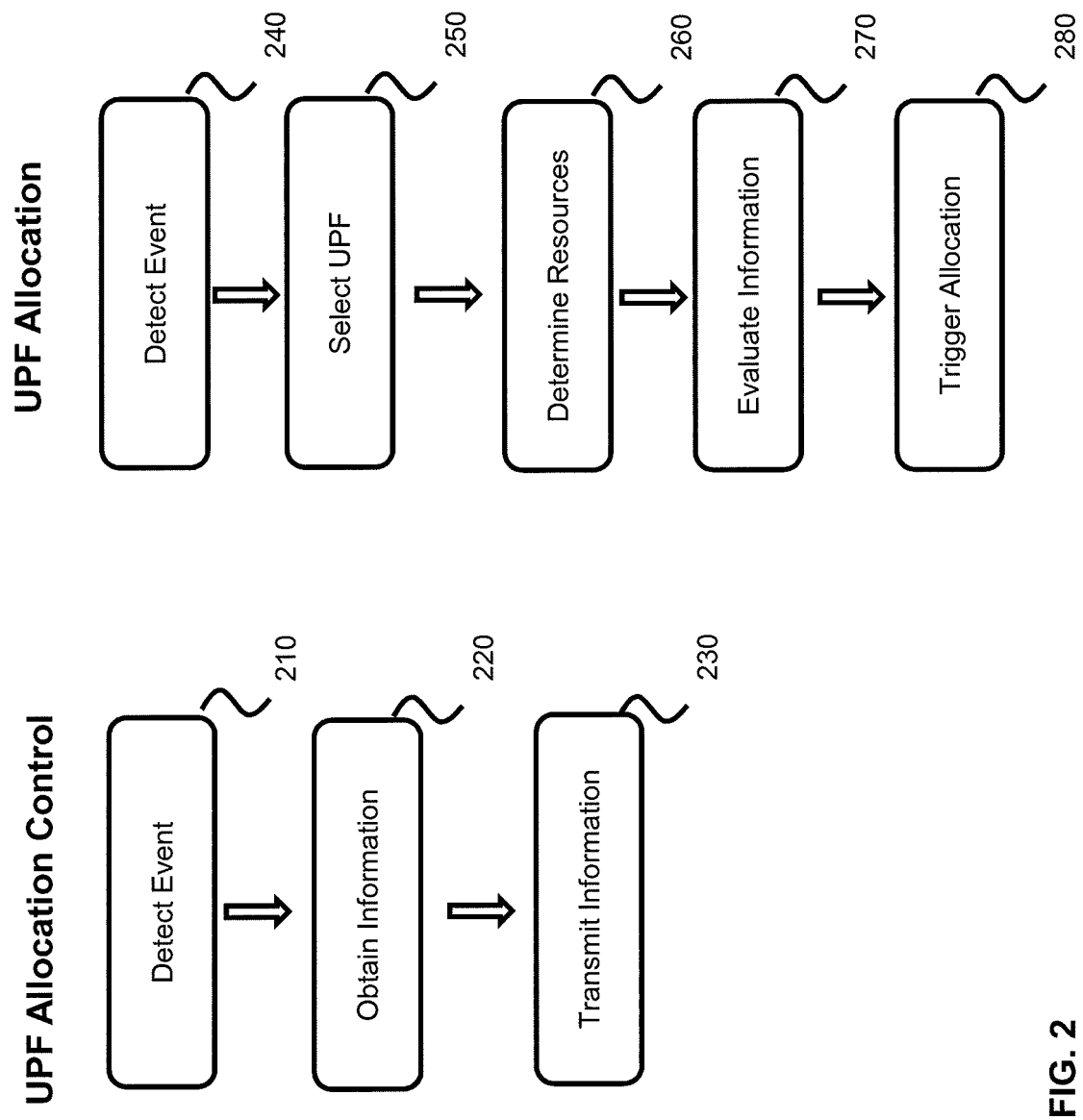
FIG. 2 shows flow diagrams illustrating method embodiments of performing user plane function allocation control and user plane function allocation.

FIG. 2 illustrates in two flow diagrams method embodiments of performing UPF allocation control and, based thereon, UPF allocation. UPF allocation control and UPF allocation as illustrated in FIG. 2 may be performed by the UPF allocation controller 160 and the UPF allocator 170 as illustrated in FIG. 1, respectively (or by other network components).

As will be explained in more detail below, the functionalities of UPF allocation control and UPF allocation are based on control information associated with the individual PDU entity 130. The control information controls allocation of a dedicated UPF 180 that will perform traffic forwarding (i.e., routing) and/or to act as a traffic anchor for the PDU entity 130. The control information is therefore sometimes also called traffic routing priority information hereinafter The control information/PDU entity association may be defined by or derived from a subscription of the particular terminal device 110 terminating the logical PDU entity 130. As an example, the control information may be defined in or derivable from a subscription profile underlying the terminal device 110. The control information may be statically be defined (e.g., for all PDU entities in regard to an individual terminal device 110) or dynamically determined (e.g., depending on a type of service provided by the data network 120 via a particular PDU entity 130).

In general, the control information underlying UPF allocation defines priority information and pre-emption information.

The priority information is indicative of a priority of the PDU entity associated with the control information relative to other PDU entities (that are likewise associated with control information). The priority information can be expressed as an attribute-value pair, AVP.

As an example, the control information may indicate the priority information in the form of a discrete number (or "level") out of a predefined range of numbers (or "levels"). If, for example, the range of numbers extends from 1 to 10, the priority information could be expressed by the number 3. A lower number will express a higher priority, or vice versa. By comparing the numbers respectively associated with two different PDU entities, it may be determined if one of the two PDU entities has a higher priority, or if both PDU entities have the same priority.

The pre-emption information indicates whether the associated PDU entity is capable of being pre-emptively allocated to a UPF over other PDU entities served by that UPF (e.g., even if this would result in one or more of the other PDU entities having to be re-allocated to another UPF). Alternatively, or in addition, the pre-emption information is indicative of whether the associated PDU entity, when served by a UPF, is vulnerable to being re-allocated for pre-emptively allocating other PDU entities to that UPF.

Pre-emption vulnerability may define whether or not a PDU entity (e.g., a PDU session or an SDF) can lose the resources assigned to it in order to admit another PDU entity with a higher priority. In this context, vulnerability may express a negative impact on a given PDU entity upon being re-allocated. This negative impact may, for example, be derived from, associated with or indicated by a specific subscription setting (e.g., a VIP subscription shall as a rule never be re-allocated to guarantee service continuity, maybe with the exception of a re-allocation to meet QoS or QoE requirements) or a specific service type underlying the PDU entity. As a service type example, a remote surgery service will generally be vulnerable in regard to service continuity upon being re-allocated, whereas no such vulnerability will generally be given for a gaming service.

In a simple implementation, the pre-emption information will be expressed as a binary value (e.g., a flag) indicative of whether the associated PDU entity is capable and/or vulnerable. In more sophisticated implementations, the pre-emption information may also be indicated by a level of capability and/or vulnerability (e.g., using a predefined range of numbers to indicate that level, in a similar manner explained above in regard to the priority information). One or both of the pre-emption capability and pre-emption vulnerability can be expressed as an AVP.

Now turning to the flow diagram on the left-hand side of FIG. 1, UPF allocation control starts in step 210 by the UPF allocation controller 160 detecting an event that requires transmission of control information associated with the PDU entity 130. The control information facilitates, or controls, an allocation of that PDU entity to one of the UPFs 180. Such an event may be the need for establishing the PDU entity 130 so as to provide data network services to the terminal device 110. The event could alternatively be receipt of an explicit control information request for the PDU entity 130. In such a situation, the PDU entity 130 may have already been established.

In a next step 220, the UPF allocation controller 160 obtains the control information associated with the PDU entity 130. The control information may be obtained, for example, from a subscription profile associated with the terminal device 110 that will terminate, or that terminates, the PDU entity 130. The control information may readily be provided in the subscription profile, or the subscription profile may still need to be parsed in order to determine the control information. The control information obtained in step 220 will comprise priority information and pre-emption information as discussed above. Optionally, the control information may comprise further information, such a definition of one or more preferred UPFs 180 (e.g., in the form of an ordered list). Alternatively, or in addition, the control information may further include information as to whether a notification is required when, in case the re-allocation of the PDU entity 130 from a serving UPF to another UPF 180 is performed, one or more service-related parameters associated with the PDU entity 130 can no longer be fulfilled. Such service-related parameters may also be defined in the subscription profile associated with the terminal device 110 that will terminate, or terminates, the PDU entity 130.

In a further step 230, the UPF allocation controller 160 transmits the control information obtained in step 220 to the UPF allocator 170 for PDU entity allocation. The control information may be transmitted together with a request to establish the PDU entity 130 or to re-allocate the (established) PDU entity 130 to another UPF.

Next, UPF allocation by the UPF allocator 170 will be described with respect to the flow diagram illustrated on the right-hand side of FIG. 2.

As illustrated in FIG. 2, UPF allocation starts with step 240 with detection, by the UPF allocator 170, of an event that requires UPF allocation to the PDU entity 130. The event detected in step 240 may be receipt of the control information transmitted by the UPF allocation controller 160 in step 230 (e.g., together with a request to establish the PDU entity 130). Alternatively, the event detected in step 240 could be the need to re-allocate the PDU entity 130 from one UPF 180 to another UPF 180.

Upon detection of the event in step 240, the UPF allocator 170 selects in step 250 a UPF 180 out of the set of UPFs 180 available to the UPF allocator 170. The selection in step 250 may be based on the indication of one or more preferred UPFs 180 in the control information received in step 240. Alternatively, or in addition, the UPF selection can be based on one more of the following parameters: loads of the available UPFs 180, capacities of the available UPFs 180, locations of the available UPFs 180, capabilities of the available UPFs 180, type of the PDU entity 130, mode of the PDU entity 130, name of the data network 120 (data network name, DNN), subscription profile associated with the terminal device 110, and data routing destination (e.g., in regard to one or both of the terminal device 110 and the data network 120).

In step 260, the available resources of the UPF 180 selected in step 250 are determined. In this regard, it may specifically be determined that the selected UPF 180 has insufficient resources for serving the PDU entity 130 (e.g., because it is already serving multiple other PDU entities). The resources determined in step 270 may pertain to one or more of a latency, bandwidth or throughput associated with the selected UPF 180. As an example, in step 260 QoS and/or QoE requirements for the PDU entity 130 (as, e.g., defined in an associated subscription) may be checked in regard to the capabilities of the selected UPF 180 of meeting these QoS and/QoE requirements.

In case the selected UPF 180 has sufficient resources for serving the PDU entity 130, the method may directly proceed to step 280 to trigger allocation of the PDU entity 130 to the selected UPF 180. The selected UPF 180 may then start serving the PDU entity 130.

Otherwise, if the selected UPF 180 has insufficient resources for serving the PDU entity 130, the method continues with step 270. In step 270, the control information associated with the PDU entity 130 is evaluated relative to the control information associated with other PDU entities currently served by the selected UPF 180. The control information associated with such other PDU entities may have been received by the UPF allocator 170 in a preceding step (e.g., in a similar manner as described above with reference to steps 210 to 230 and/or step 240). The UPF allocator 170 may thus locally maintain a database with all the control information for PDU entities for which the UPF allocator 170 has previously performed UPF allocation.

In step 270, the priority information associated with the PDU entity 130 is compared with the priority information associated with the other PDU entities currently served by the selected UPF 180. Moreover, the pre-emption information associated with the PDU entity 130 and/or the pre-emption information associated with one or more other PDU entities currently served by the selected UPF 180 is evaluated.

Depending on a result of the evaluation in step 270, the UPF allocator 170 triggers, in step 280, allocation of the PDU entity 130 to either the UPF 180 selected in step 250 or to another UPF 180. If allocation of the PDU entity 130 to another UPF 180 is triggered, this may constitute an event in the sense of step 240, so that the other UPF 180 will be selected in step 250, and the method will continue as explained above.

As an example, the PDU entity 130 may in step 280 be allocated to the UPF 180 selected in step 250, when the priority information indicates that the PDU entity 130 has a higher priority than one or more of the PDU entities currently served by the selected UPF 180 and, in addition, when the pre-emption information evaluation yields that the PDU entity 130 is capable of being pre-emptively allocated or other PDU entities while the one or more PDU entities currently served by the selected UPF 180 that have a lower priority than the PDU entity 130 are not vulnerable to being re-allocated. In such a case, the corresponding one or more PDU entities currently served by the selected UPF 180 may be re-allocated to another UPF 180 so that the selected UPF 180 has free resources for properly serving the PDU entity 130 (e.g., according to its associated QoS and/or QoE parameters).

On the other hand, in step 280 an allocation of the PDU entity 130 to an UPF 180 different from the UPF 180 selected in step 250 may be triggered in case the priority information evaluation in step 280 yields that the PDU entity 130 has a lower priority than all the other PDU entities currently served by the selected UPF 180. The PDU entity 130 may in similar manner be allocated to a UPF 180 different from the selected UPF 180 in case the pre-emption information evaluation yields that the PDU entity 130 is not capable of being pre-emptively allocated over other PDU entities currently served by the selected UPF 180, or that all the PDU entities currently served by the selected UPF 180 are vulnerable to being re-allocated to another UPF 180.

In cases in which the PDU entity 130 has the same priority than the lowest-ranked PDU entities currently served by the UPF 180 selected in step 250, the allocation decision in step 280 may solely be based on the available pre-emption information or, additionally or in the alternative, based on one or more other rules.

Figure 3:
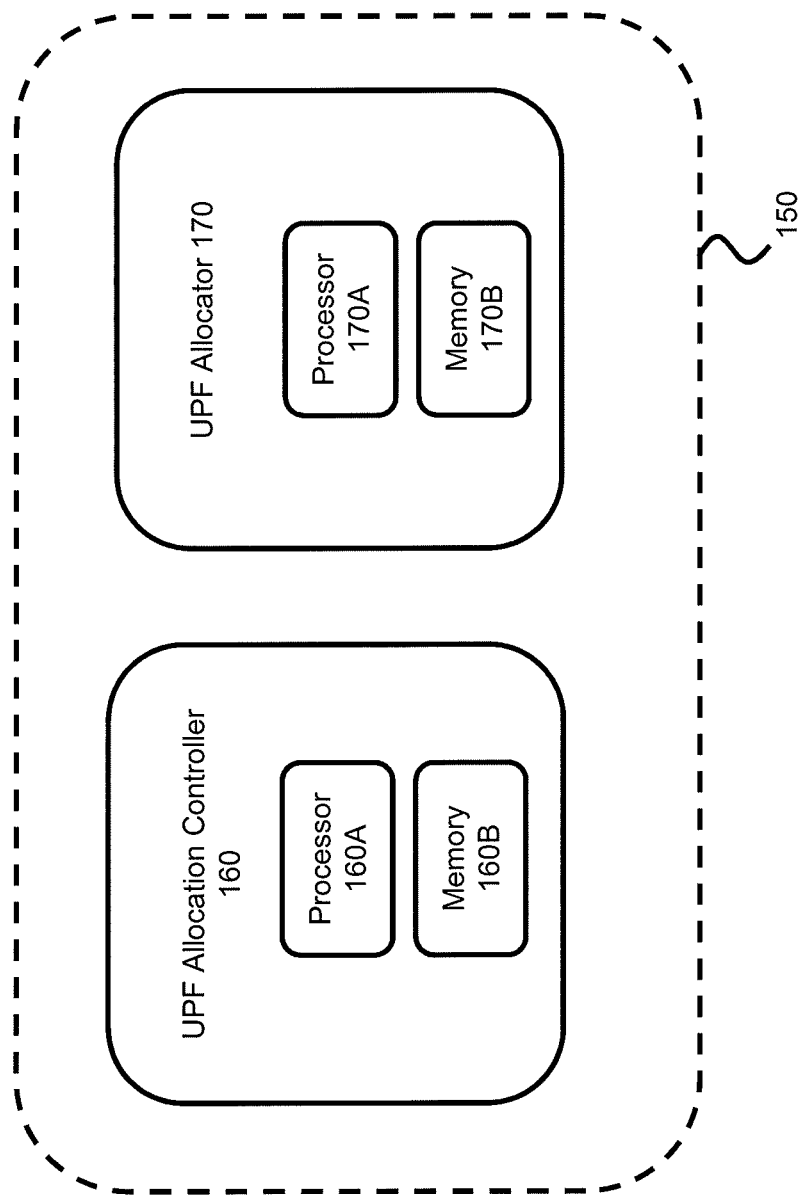
FIG. 3 shows block diagrams schematically illustrating embodiments of a user plane function allocation controller and a user plane function allocator.

FIG. 3 shows possible realisations of the UPF allocation controller 180 and the UPF allocator 170 described herein. As shown in FIG. 3, the UPF allocation controller 160 comprises a processor 160A and a memory 160B coupled to the processor 160A. The memory 160B comprises program code that controls the processor 160A to perform aspects of the technique presented herein in regard to UPF allocation control upon executing the program code (see, e.g., steps 210 to 230 in FIG. 2).

In a similar manner, the UPF allocator 170 illustrated in FIG. 3 comprises a processor 170A and a memory 170B coupled to the processor 170A. The memory 170B comprises program code that controls the processor 170A to perform aspects of the technique presented herein in regard to UPF allocation upon executing the program code (see, e.g., steps 240 to 280 in FIG. 2).

Figure 4:
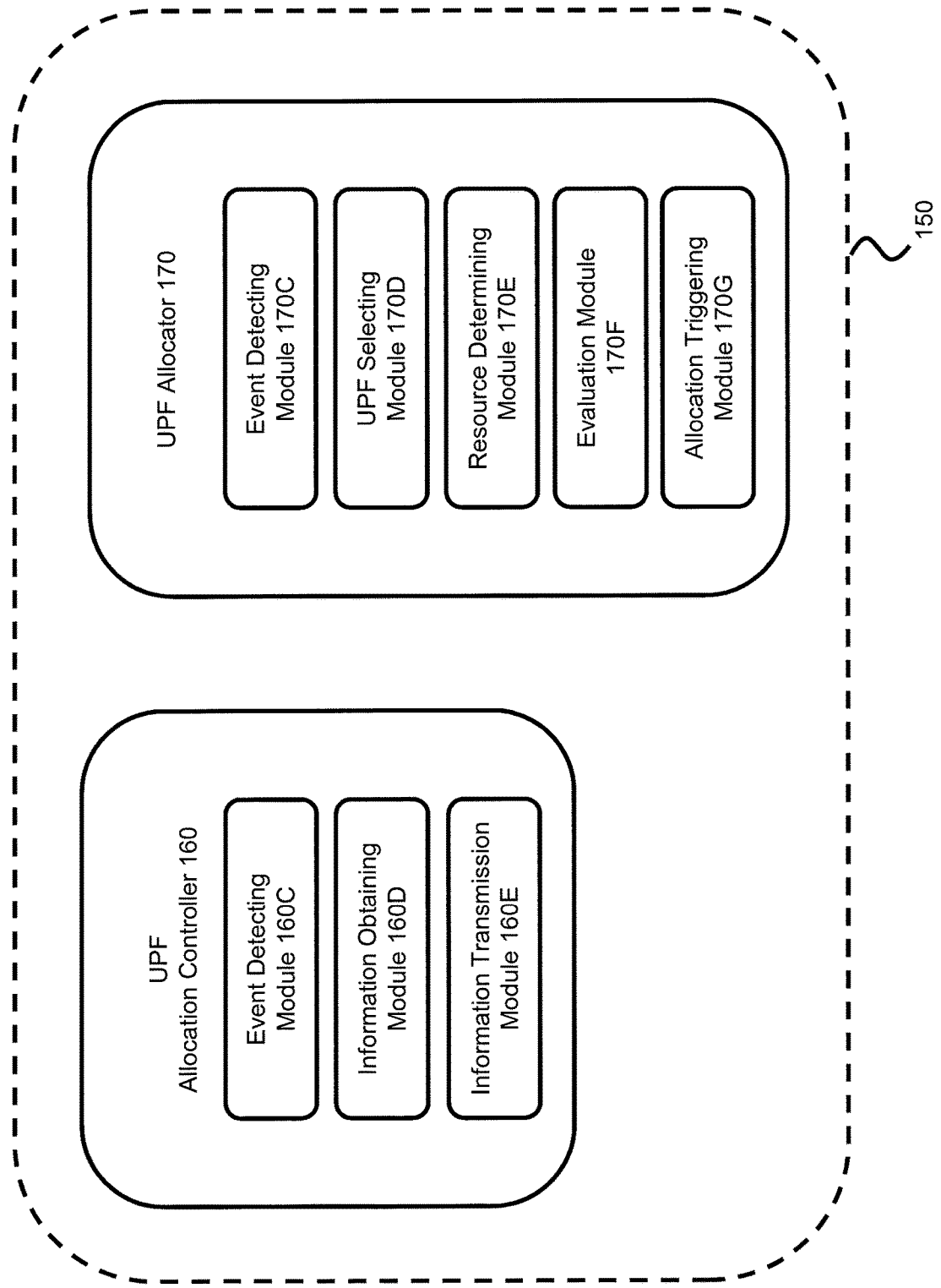
FIG. 4 shows block diagrams schematically illustrating further embodiments of a user plane function allocation controller and a user plane function allocator.

Further exemplary embodiments of the UPF allocation controller 160 and the UPF allocator 170 are illustrated in FIG. 4. As shown therein, the UPF allocation controller 160 comprises an event detecting module 160C, an information obtaining module 160D and an information transmission module 160E. These three modules 160C, 160D, 160E are configured to perform the event detecting, information obtaining and information transmission aspects, respectively, as discussed herein (see, e.g., step 210 to 230 in FIG. 2). The modules 160C, 160D and 160E may be configured as hardware entities or may be installed as program code in the memory 160B (see FIG. 3).

The UPF allocator 170 of FIG. 4 comprises in a similar manner an event detecting module 170C, an UPF selecting module 170D, a resource determining module 170E, an evaluation module 170F as well as an allocation triggering module 170G. The modules 170C to 170G may be configured to perform the corresponding steps 240 to 280 as illustrated in FIG. 2. The modules 170C to 170G may be configured as hardware entities or may be installed as program code in the memory 170B of the UPF allocator 170 illustrated in FIG. 3.

In the following, further embodiments will be described with reference to an exemplary 5G implementation (e.g., in accordance with 3GPP TS 23.501). The same reference numerals as used in the proceeding embodiments will denote functionally identical or similar components.

Figure 5:
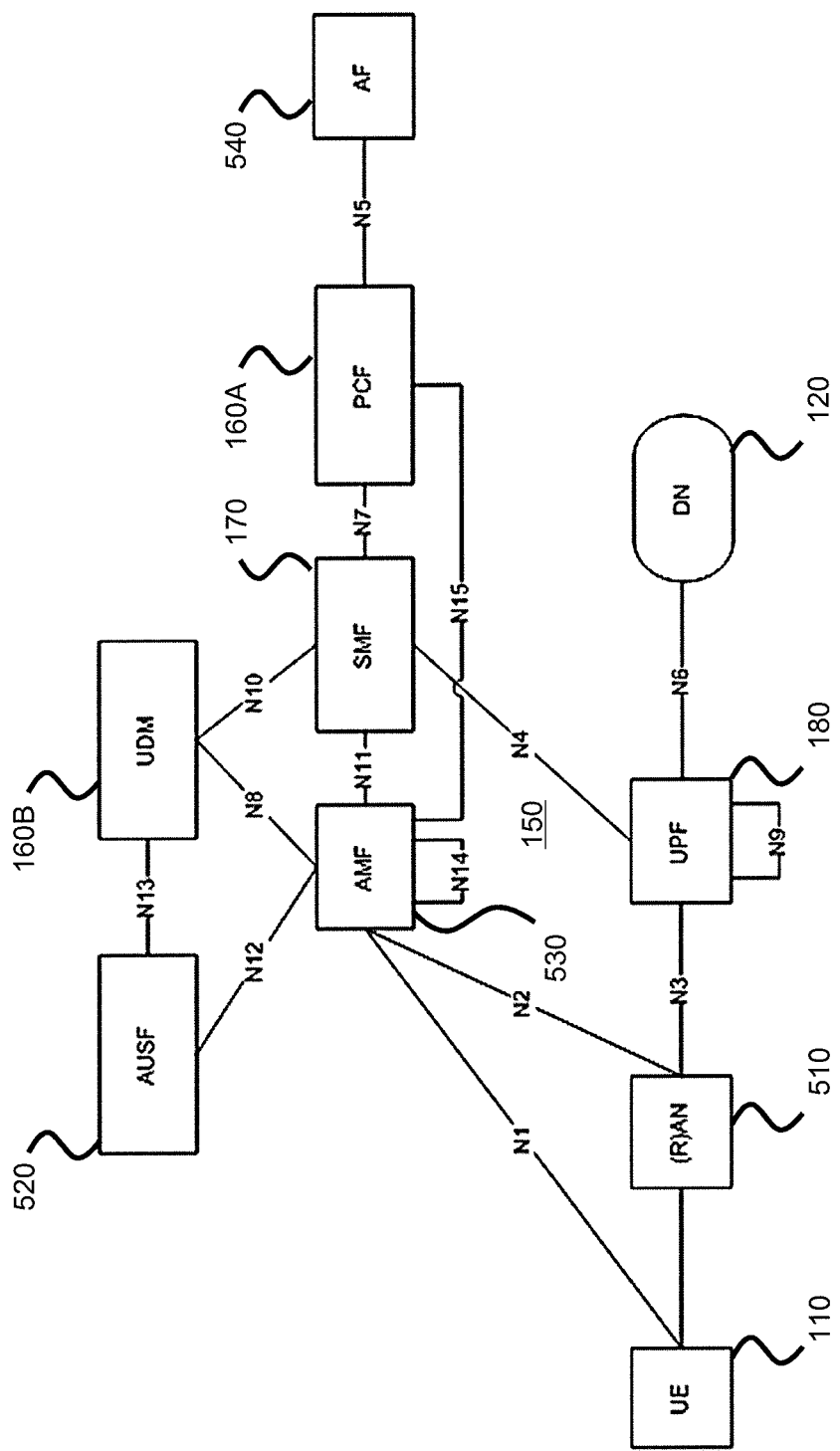
FIG. 5 shows a block diagram schematically illustrating an embodiment of a 5G network system in which user plane function allocation can be performed.
Figure 6:
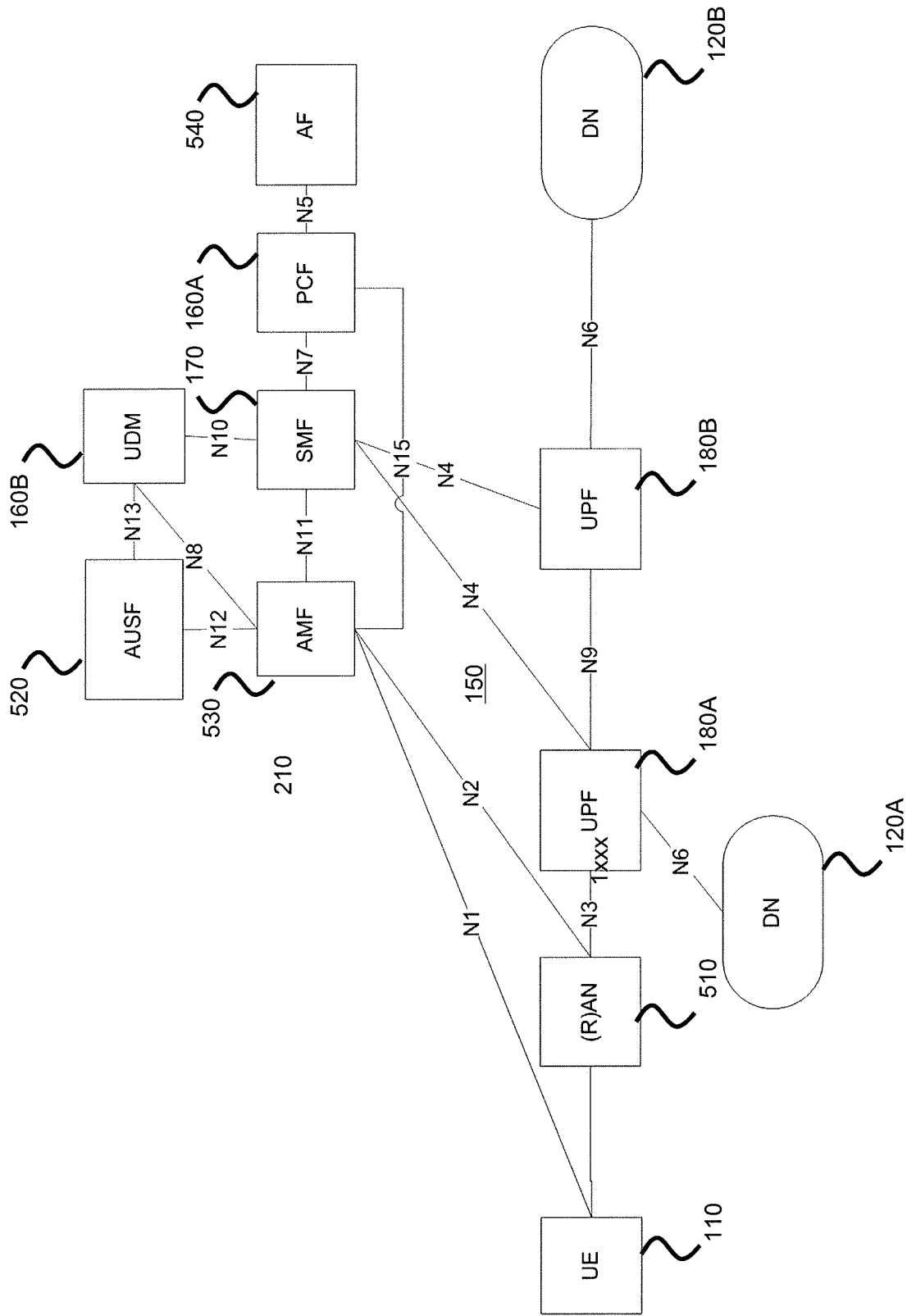
FIG. 6 shows a block diagram schematically illustrating another embodiment of a 5G network system in which user plane function allocation can be performed.

FIGS. 5 and 6 illustrates the components, functions and interfaces (also called reference points in 3GPP TS 23.501) of exemplary network systems in which the technique presented herein, in particular the embodiments described above with reference to FIGS. 1 to 4, can be implemented. In more detail, FIG. 5 describes a non-roaming 5G system architecture in reference point representation, while FIG. 6 illustrates the application of a non-roaming 5G system architecture for concurrent access to (e.g., local and central) data networks 120 in reference point representation.

In the system architecture illustrated in FIG. 5, the UPF 180 is functionally located between a terminal device 110 (also called User Equipment, UE, in 5G terminology) on the one hand and a data network 120 on the other. An access network 510, for example a radio access network, RAN, provides access to a core network domain 150 for the UE 110. The core network domain 150 comprises, in addition to the UPF 180, an SMF 170 (acting as UPF allocator) as well as PCF 160A and a UDM 160B (both being capable of acting as UPF allocation controller). The core network domain 150 further comprises an authentication server function, AUSF, 520, a core access and mobility management function, AMF 530 and an AF 540.

The exemplary system architecture illustrated in FIG. 6 is similar to the architecture in FIG. 5 but includes a first (e.g., local) data network 120A as well as second (e.g., central) data network 120B. Moreover, each data network 120A, 120B is coupled to a dedicated UPF 180A, 180B, respectively. The two UPFs 180A, 180B are centrally controlled by the SMF 170.

In the following embodiments, the control information that includes the priority information and the pre-emption information will also be denoted as traffic routing priority, TRP, information. The TRP information (optionally together with further information) enables the SMF 170 to decide about the particular UPF 180 that is to be allocated a given PDU entity (i.e., PDU session or SDF). The TRP information may be created and signaled in the form of a policy control and charging, PCC, parameter.

The TRP information defines the following parameters:
'Priority Level' parameter: The 'Priority Level' (or TRP level) parameter is the relative importance of the traffic of a particular UE 110 in relation to traffic of other UEs when the SMF 170 decides to perform traffic offload of traffic with low latency or high bandwidth requirements. It may in particular allow to decide whether a PDU session and/or SDF of a particular user has precedence over other users' PDU sessions/SDFs (and, thus, needs to be allocated to the most appropriate UPF 180 according to its QoS profile), or if that PDU session and/or SDF can be allocated to a second, third and so on "best" UPF 180 without endangering the user's QoE.

The priority level allows an SMF 170 to select one UPF 180 (e.g., from a 'Preferred UPF(s)' list, if received (see below), or from a list of UPFs 180 the SMF 170 is able to derive autonomously. The priority level can, for example, define the relative importance of performing service traffic offload for a low latency service for a VIP terminal device against doing service traffic offload for a non-VIP terminal device for the same service.

In one exemplary implementation used below, the range of the 'Priority Level' parameter runs from 1 on, with 1 as the highest level of priority. This implies that the SMF 170 shall meet the allocation of the preferred UPF 180 of a SDF of priority level N in preference to meeting the allocation of the same UPF 180 of a SDF on the next priority level greater than N when the SMF 170 detects that it is not able to allocate both SDFs in the same UPF 180 without, for example, losing service availability according to the service requirements. The priority level can also be used to decide which existing SDF to pre-empt.

'Pre-emption capability parameter' and 'pre-emption vulnerability parameter': These parameters pertain to the PDU session and/or SDF allocated (or to be allocated) to a given UPF 180. Pre-emption capability defines whether a particular PDU session and/or SDF can get resources in a UPF 180 that were already assigned to another PDU session and/or SDF (e.g., with a lower priority). As a result, the PDU session and/or SDF with the lower priority level is re-allocated to another UPF 180. Pre-emption vulnerability defines whether PDU session and/or SDF can lose the resources assigned to it in a UPF 180 in order to admit a PDU session and/or SDF (e.g., with a higher priority). The pre-emption capability information and the pre-emption vulnerability information can each be a flag that is either set either set to 'yes' or 'no'.

'Preferred UPF(s)' parameter (optional): The UPF(s) 180 proposed by the PCF 160 to handle the PDU session traffic and/or SDF traffic for the involved UE 110. The preferred UPF(s) 180 may be indicated in an ordered or non-ordered list. When the 'Preferred UPF(s)' parameter is not included in the TRP information, the SMF 170 may select a particular UPF 180 according to one or more standard criteria (see, e.g., Sect. 6.3.3 of 3GPP TS 23.501 V0.4.0 (April 2017)). Moreover, the SMF 170 may perform its selection also based on a combined evaluation of the 'Preferred UPF(s)' parameter and one or more standard criteria.

'Notification of UPF relocation' parameter (optional): This parameter allows the PCF 160 to request a notification from the SMF 170 when the requested UPF 180 allocation cannot, or can no longer, be fulfilled.

Signaling of the TRP information may technically be achieved in the 5G network architectures of FIGS. 5 and 6 by enhancing the PCF to SMF N7 interface. In case the functionality is provided via the UDM 160B, the impacted interface is the UDM to SMF N10 interface.

TRP information, and control information in general, allows a differentiation per subscription and/or per service of the criticality of allocating a particular PDU entity to a particular UPF, and thus facilitates a decision about the breakout of traffic according to service requirements (such as the latency and bandwidth parameters in a QoS and/or QoE profile defined for the subscription). The notification mechanism makes it possible to identify the affected subscribers (and terminal devices) in advance, so that they can get a notification (and/or their QoS/QoE profile, charging, etc. updated).

In the 5G network architectures illustrated in FIGS. 5 and 6, the TRP information-related functionality may be provided by the PCF 160A, as an extension to the PCC rules, so that it enables the network operator to build subscription-based policies that consider the subscriber profile and input from other sources (e.g., subscriber location, device type, time of day, external events, etc.). This functionality can also be provided by the UDM 160B, especially for PDU session level allocation decisions.

Figure 7:
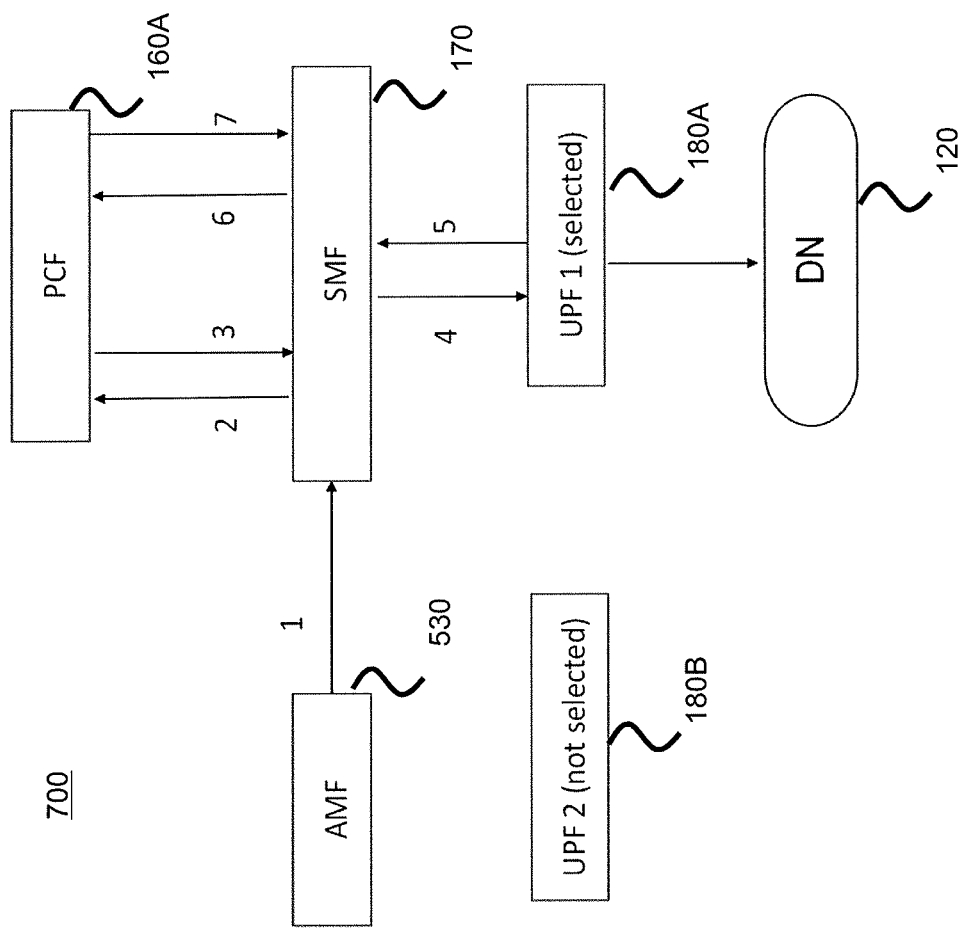
FIG. 7 shows a sequence diagram illustrating further method embodiments of performing user plane function allocation control and user plane function allocation.

FIG. 7 illustrates in a sequence diagram 700 an embodiment of UPF allocation in 5G network architectures of the types illustrated in FIGS. 5 and 6. The same reference numerals will again be used to denote the same or similar components. In the scenario illustrated in FIG. 7 it will be assumed that the PDU entity (see reference numeral 130 in FIG. 1) is a particular PDU session that needs to be established and that a single UPF 180 is allocated to all the services (and SDFs) in that PDU session.

With reference to FIG. 7, the following signaling sequence is performed to achieve UPF allocation:

1. AMF 530 sends PDU Session establishment message to SMF 170. The session establishment message includes information such as DNN, sessionId, SubscriberID, etc.

2. SMF 170 forwards the PDU session establishment message via the N7 interface to PCF 160A.

3. PCF 160A provides TRP information to SMF 170 that is associated with the PDU session to be established (and the underlying the SDF traffic) in the corresponding PCC rules for that PDU session at message level in the N7 interface response.

4. SMF 170 selects a first UPF (reference numeral 180A) taking into account the TRP information received from PCF 160A at PDU session level and PCC rule/SDF level. It establishes a N4 session with the UPF1 (PDN level). This process will now be described in greater detail:

SMF 170 pre-selects preferred UPF(s) 180 (for the branching and for the different services) considering the 'Preferred UPF(s)' parameter received in the TRP information at PDU session level and the information received at SDF level.

If preferred UPF(s) 180 is not included at PDU session level and/or SDF level, SMF 170 derives preferred UPF(s) 180 based on other criteria, such as UPF and UE location, UE profile, requested services profiles etc. (e.g., as currently specified in Sect. 6.3.3 of 3GPP TS 23.501 V0.4.0).

We assume that SMF 170 pre-selects UPF1 for all the SDFs of the PDU session to be established. If pre-selected UPF1 is (or would be becoming) congested (i.e., does not or will not have sufficient resources for the PDU session to be established), SMF 170 checks the corresponding 'Priority level' parameter for SDF admission control. If the 'Priority level' is N, SMF 170 allocates pre-selected UPF1 if all the other SDFs currently served by UPF1 have a priority level greater than N (assuming that a lower priority level indicates a higher priority). This may entail that one or more currently served SDFs may need to be re-allocated. Otherwise, SMF 170 pre-selects an alternative UPF for the SDFs of the PDU session to be established and determines its available resources (e.g., pre-selects UPF 2 in FIG. 7, see reference numeral 180B).

If UPF1 is congested and the priority level N associated with the new SDF is lower (i.e., higher priority) than the priority level of the SDFs currently served by UPF1, and the new SDF has pre-emption capability set, SMF 170 initiates UPF re-allocation of a SDF with the highest priority level (i.e. lower priority users) and pre-emption vulnerability not set to another UPF and allocates the pre-selected UPF1 to the requesting PDU session. Otherwise, the PDU session request is rejected. Once the UPF selection has been done, SMF 170 starts the N4 session with selected UPF, such as UPF1.

5. UPF1 provides an IP address to the PDU session and signals that IP address to SMF 170.

6. SMF 170 sends PDU Session Modification including the IP address assigned to the PDU session to PCF 160A.

7. PCF 160A updates the session information with the IP address and acknowledges the message.

Figure 8:
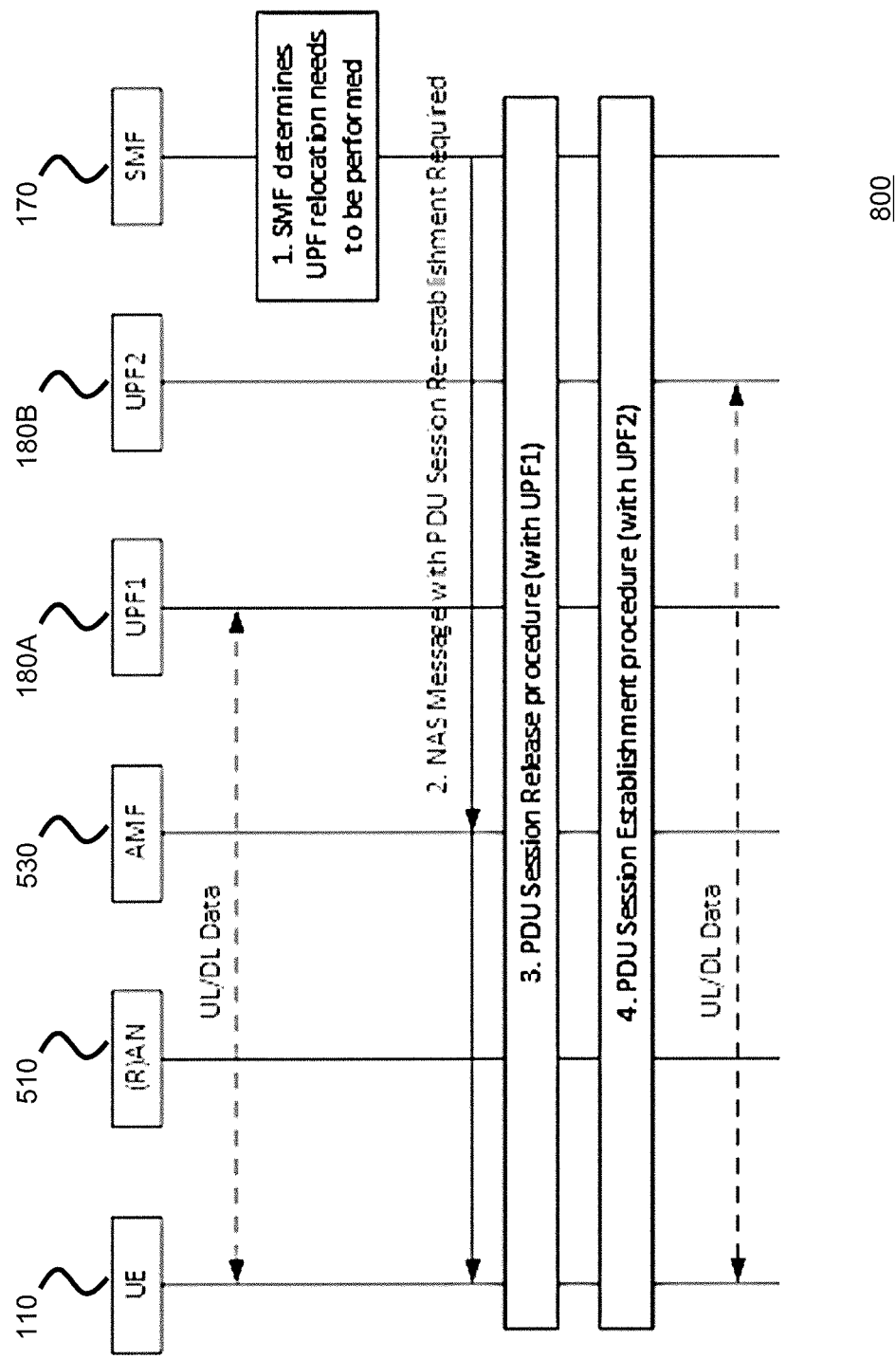
FIG. 8 shows a signaling diagram illustrating further method embodiments of performing user plane function allocation control and user plane function allocation.

FIG. 8 illustrates in a sequence diagram 800 an embodiment of UPF re-allocation in 5G network architectures of the types illustrated in FIGS. 5 and 6. The same reference numerals will again be used to denote the same or similar components. In the scenario illustrated in FIG. 8, it will be assumed that the PDU entity (see reference numeral 130 in FIG. 1) is a particular PDU session that is currently served by UPF1 (reference numeral 180A).

1. SMF 170 determines that serving UPF1 needs to be re-allocated in regard to a particular PDU session/SDF due to events that may benefit from UPF re-allocation, such as a new PDU session request associated with a 'Priority Level' parameter N that is lower than the 'Priority Level' parameter of the SDFs/PDU sessions currently served by UPF1. In order to take the decision, SMF 170 additionally takes into account the available 'pre-emption capability/vulnerability' parameters. The SDFs/PDU sessions with the highest priority level (i.e., lowest priority) and no pre-emption vulnerability will be moved first.

2. SMF 170 sends a non-access stratum, NAS, message to UE 110 terminating a SDF/PDU session that needs to be re-allocated. The NAS message is sent via AMF 530 and contains the PDU session ID that needs to be relocated with an indication that a PDU session re-establishment to the same DN (see reference numeral 120 in FIGS. 5 and 6) is required.

3. SMF 170 performs a PDU session release procedure.

4. UE 110 initiates a PDU session establishment procedure. Then, AMF 530 forwards this session establishment request received from UE 110 to the same SMF 170, so that SMF 170 can select a new UPF (e.g., UPF2, see reference numeral 180B) for the re-established PDU session.

5. Once SMF 170 has reselected new UPF, SMF 170 may notify one or both of PCF 160A and UDM 160B indicating the newly selected UPF and, optionally, the reason for reallocation.

Figure 9:
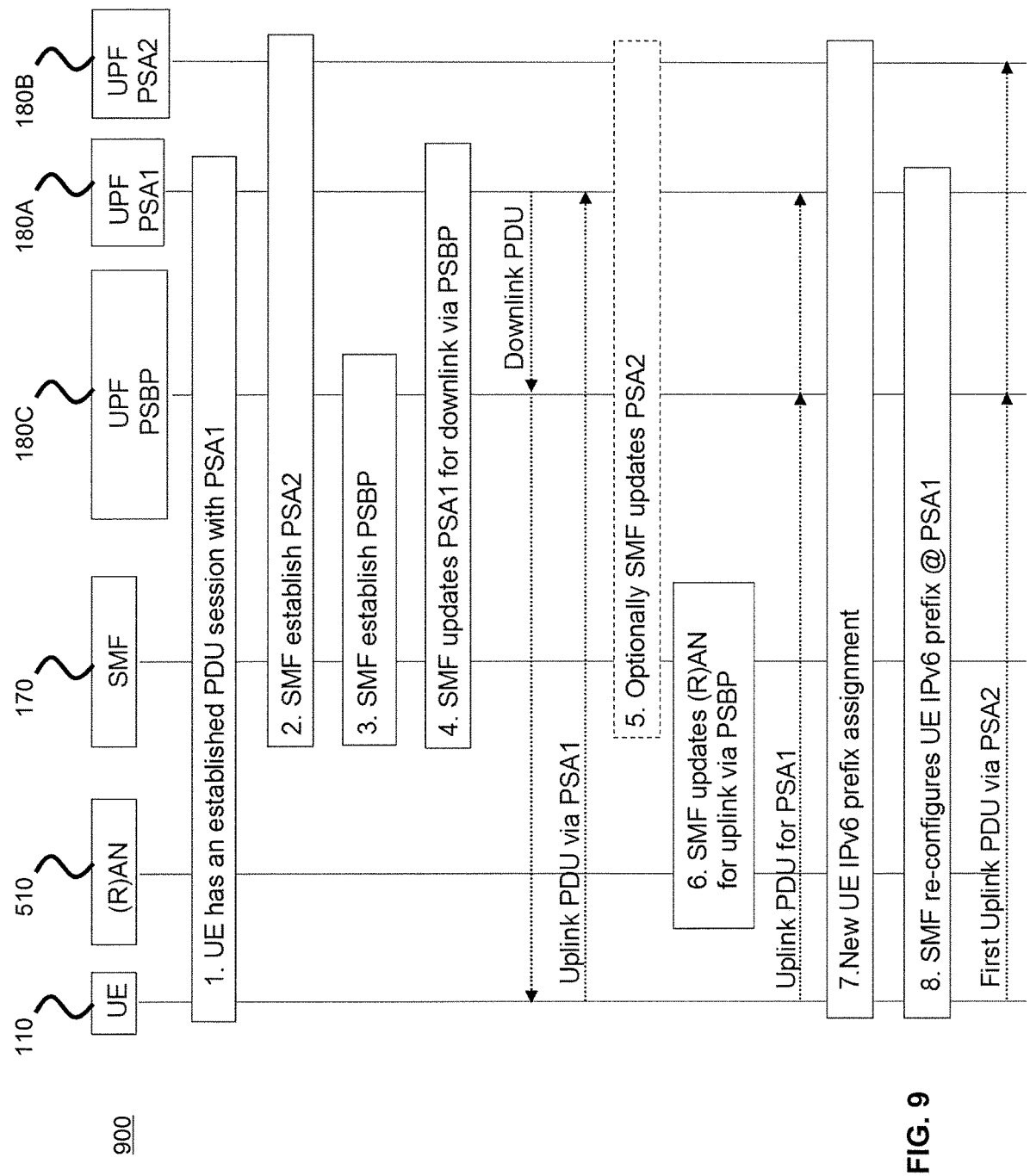
FIG. 9 shows another signaling diagram illustrating still further method embodiments of performing user plane function allocation control and user plane function allocation.

FIG. 9 illustrates in a sequence diagram 900 an embodiment of insertion of a new UPF 180 in a UPF service chain for specific service traffic offload to a local data network. The embodiment may be implemented in a 5G network architecture of the type illustrated in FIG. 6 which includes a local data network 120A as well as central data network 120B. The same reference numerals will again be used to denote the same or similar components.

In more detail, FIG. 9 illustrates the insertion of a new UPF 180 in the UPF service chain using IPv6 multi-homed PDU session. In this case, the SMF 170 first prepares a new PDU session anchor, a PDU session branching point (either as stand-alone function, co-located with the original PDU session anchor or co-located with the new PDU session anchor) and also the original PDU session anchor. In addition, the SMF 170 updates the (R)AN 510. It also notifies the UE 110 of the existence of a new IPv6 prefix and re-configures the original IPv6 prefix.

1. Referring to FIG. 9, UE 110 has an established PDU session with UPF 180A including the PDU session anchor 1 ('PSA1' in FIG. 9), for example as described in connection with the sequence diagram 700 of FIG. 7. The PDU session user plane involves at least (R)AN 510 and PDU session anchor 1 (i.e., UPF 180A).

2. At some point, SMF 170 decides to establish a new PDU session anchor (e.g., due to UE mobility, new/modified PCC rules, new SDF with new requirements for low latency or high bandwidth, etc.). SMF 170 then selects a new UPF 180B using the TRP information received in the SDF and, using the N4 interface, configures new UPF 180B to include a new PDU session anchor (PSA2/UPF 180B) of the multi-homed PDU session. In this process, a new IPv6 prefix is allocated to the PDU session.

3. SMF 170 also configures, via the N4 interface, an UPF 180C as branching point (PDU session branching point, PSBP) for the multi-homed PDU session. In this regard SMF 170 considers the information received in the TRP information.

SMF 170 provides the branching point with the necessary UL traffic forwarding rules (related with the prefix of the IPv6 source address of UL traffic) towards the PSA1 and PSA2 (such as IPv6 prefix@PSA1, IPv6 prefix@PSA2, PSA1 CN Tunnel Information and PSA2 CN Tunnel Information). In addition, Access Network, AN, Tunnel Information may be provided for downlink forwarding.

4. SMF 170 updates, again via the N4 interface, PSA1 (i.e., UPF 180A). It provides the PDU session CN Tunnel Information for the PSBP (i.e., UPF 180C) to replace the AN Tunnel Information.

5. Optionally, if UPFs 180 allocate the CN Tunnel Information, SMF 170 updates PSA2. It provides the PSBP CN Tunnel Information.

6. SMF 170 updates the (R)AN 510, via the interface N2, with update information over N11. It provides the new PSBP CN Tunnel Information.

7. SMF 170 notifies UE 110 of the availability of the new IP prefix@PSA2. This is performed using an IPv6 Router Advertisement message (see, e.g., RFC 4861).

8. SMF 170 then re-configures UE 110 for the original IP prefix@PSA1. This is performed using an IPv6 Router Advertisement message (see, e.g., RFC 4861).

Once this procedure has been completed, the first uplink PDU can be sent via PSA2 (i.e., UPF 180B).

The embodiments of FIGS. 10 to 14 illustrate examples of how the TRP information can be applied in the use case of a live even in, for example, a football stadium, where a Virtual Reality Application (VR application) 1000 is offered to the public. The public is divided into VIP users operating terminal devices 110A and non-VIP users operating terminal devices 1106. The fact whether a particular terminal device 110 is associated with a VIP user or non-VIP user may be defined by a setting or profile in the associated description. It is assumed that QoE of VIP users needs to be prioritized over QoE of non-VIP users.

Figure 10:
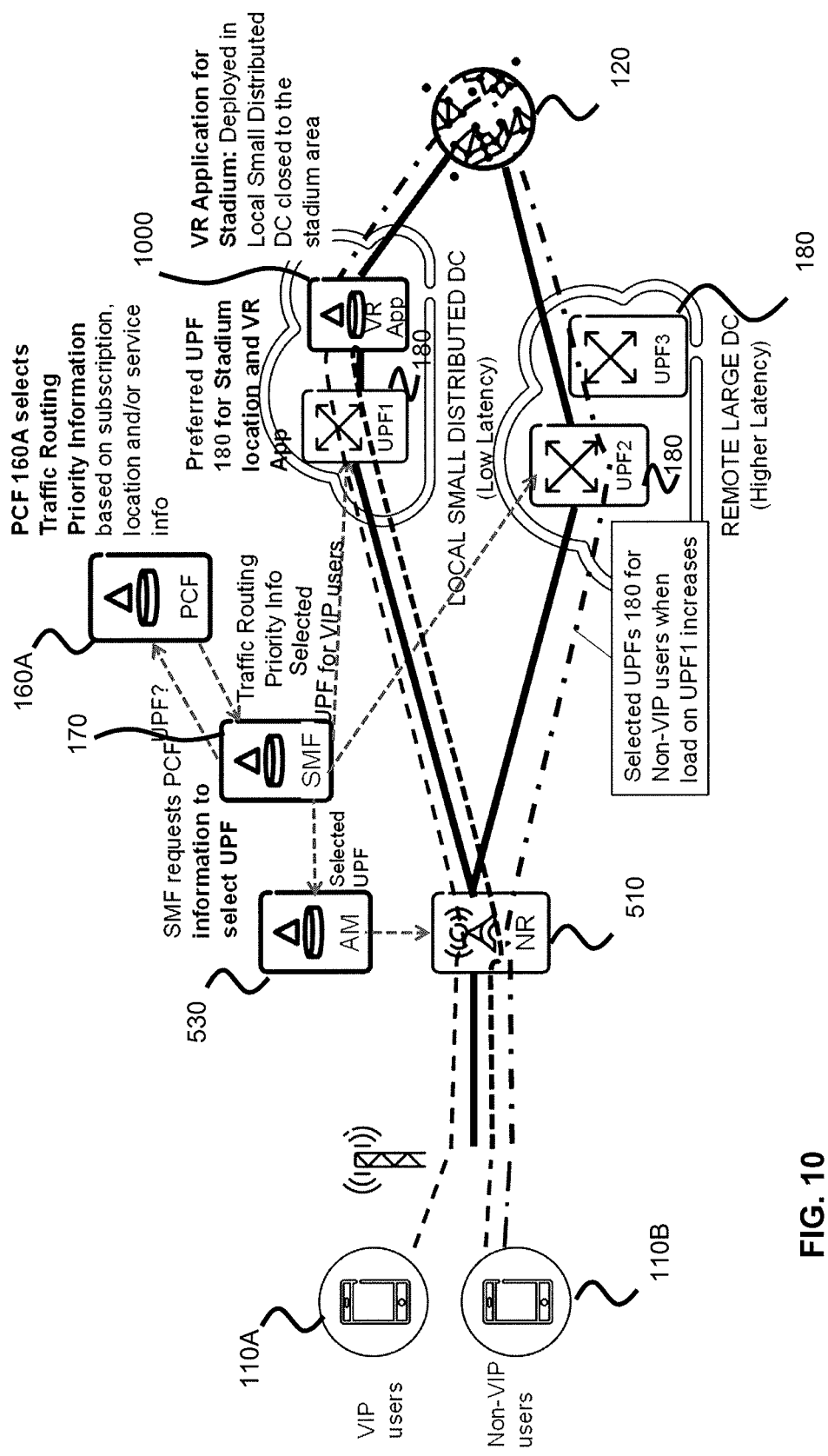
FIG. 10 shows a schematic diagram illustrating a combined system and signaling embodiment.
Figure 12:
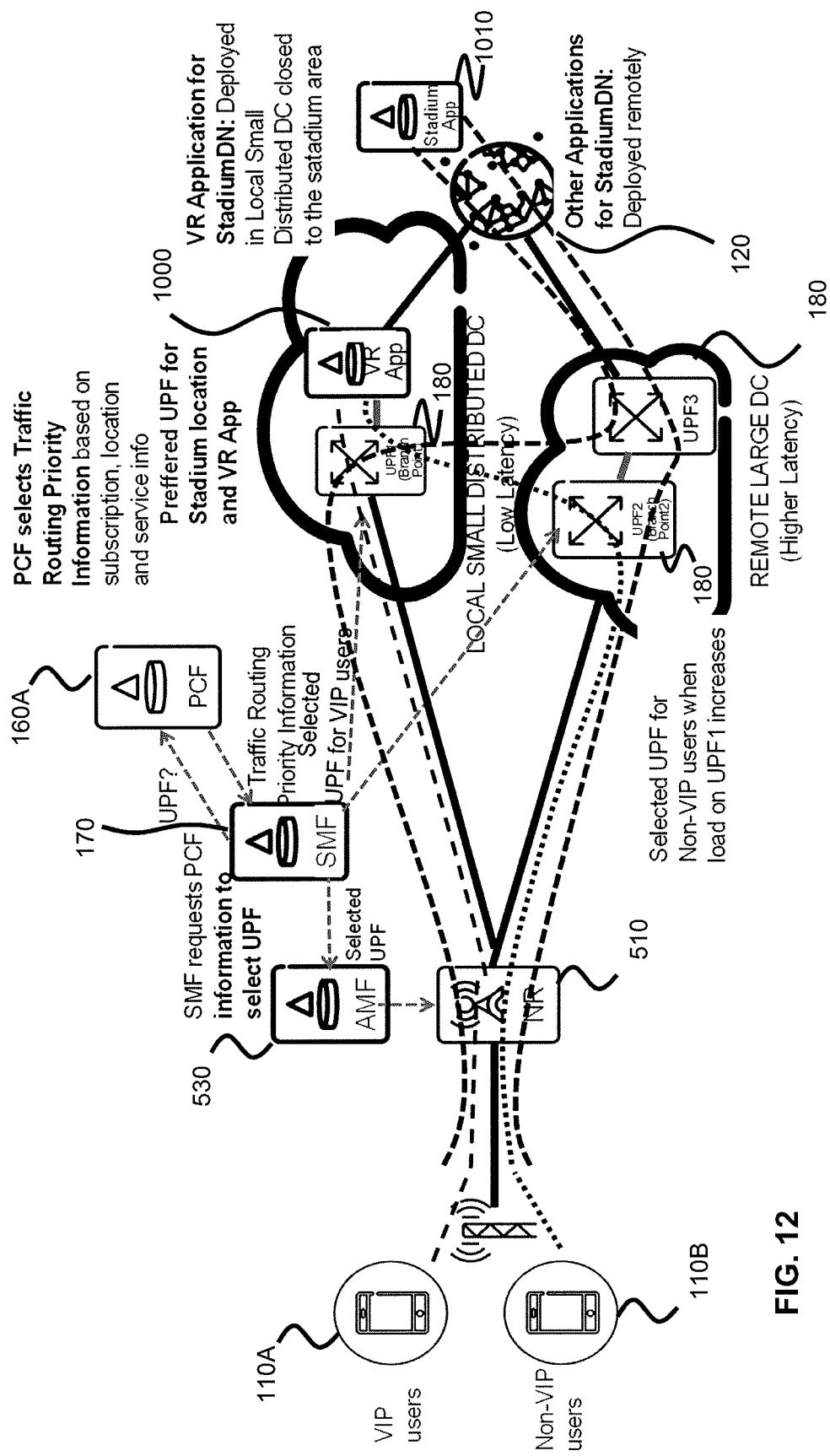
FIG. 12 shows a schematic diagram illustrating another combined system and signaling embodiment.

FIG. 10 illustrates how breakout of VR application traffic for VIP users is prioritized. The signaling steps illustrated in FIG. 10 in general correspond to the signaling steps discussed above with reference to the preceding embodiments, but take into account that UPF1 is located in a local data center and thus provides higher QoE than UPF2 and UPF2, that are located in a remote central data center. As such, UPF1 will be the preferred UPF for VIP users, whereas UPF2 and UPF3 may be allocated (or re-allocated) to non-VIP users in case UPF1 has insufficient resources.

The table in FIG. 11 shows an example of the control information parameters assigned per user for the VR application 1000 implementing the 'live Stadium' service that is made available at the data network, DN, 120 'StadiumDN'. According to the parameters in FIG. 11, the UPF 180 is allocated based on the data network name ('StadiumDN') and the control information sent at PDU session level. In the present embodiment, no control information is defined at the SDF level.

In general, as explained above, the PCF 160A can transmit the control information at (or for) PDU session level and/or at (or for) SDF level. The control information at PDU session level is applied to all SDFs for which no dedicated control information is available. It thus represents default control information for a PDU session. The control information signaled at SDF level typically applies to an individual SDF within the PDU session. Different control information (e.g., different priority levels) at PDU session level and at SDF level indicate that different UPFs 180 might be selected for specific SDFs within the same PDU session.

FIG. 11 illustrates how stadium service data flows can be broken out via UPF1 (VIP user branching point in UPF1). Specifically, FIG. 11 illustrates how the control information is applied in the use case of a live event in which other services ('Stadium web info' service 1010) are also offered as part of the data network 'StadiumDN'. The user terminal are again is divided into VIP user terminals 110A and non-VIP user terminals 110B.

The table in FIG. 13 shows an example of how the control information could be defined for 'StadiumDN' for the VIP and non-VIP users at PDU session level.

According to the table in FIG. 13, with the information included at PDU session level, the SMF 170:
  for VIP user terminal 110A, will allocate the UPF3 for PDU session SDFs that do not include control information. Note that the UPF branching function could be also influenced by the UPF selected for the most demanding SDF,
  for non-VIP user terminals 110B, will allocate the UPF anchor function in UPF3. Note that the UPF branching function could be also influenced by the UPF selected for the most demanding SDF.

The table in FIG. 14 shows an example of how the control information could be defined for 'StadiumDN' for the VIP and non-VIP users at SDF level.

Combining control information at PDU session level with control information at SDF level, the SMF 170 performs in the following UPF allocation decisions:
  for VIP user terminals 110A, the SMF 170:
    will allocate the UPF1 as UPF branching function and as UPF anchor for the service 'live Stadium', and
    will allocate UPF3 as UPF anchor for 'Stadium web info' service.
  For non VIP user terminals 110B, the SMF 170 and
    will allocate UPF2 as UPF branching function (e.g., due to non-VIP users SDFs for 'live Stadium' service can be re-allocated to UPF2 in case of UPF1 congestion),
    will allocate UPF1 for 'live Stadium' service while UPF1 is able to provide service level for all allocated users, and
    will allocate UPF3 for 'Stadium web info' service.

As has been shown above, the technique presented herein allows the PCF 160A (or the UDM 160B) to control the SMF 170 in the UPF allocation (and re-allocation) procedures. This control is primarily achieved by assigning priority information and pre-emption information to individual PDU sessions and/or individual SDFs. The corresponding control information (sometimes also denoted as TRP information herein) assigned at a PDU session level may also be applied at an SDF level unless specific control information is assigned at the SDF level. The control information may include an indication of the preferred UPF(s) 180 for a given SDF, set of SDFs or PDU session, which would take precedence over the UPFs 180 that may autonomously be derived by an SMF 170 based on other rules. The control information may also trigger the SMF 170 to notify the PCF 160A (or the UDM 160B) when the UPF 180 is re-allocated for a particular PDU session nor SDF and/or when the service requirements cannot be longer met.

By implementing the technique presented herein, network operators are opening the door to new and complex use cases that allow the dynamic modification of the UPF allocated to a PDU entity (e.g., a PDU session and/or SDF) with the flexibility provided by subscription-based policy decisions. This technique enables network operators to reduce the capacity needs of the backhaul networks and optimize them to actual use and expectations of the users consuming the delivered services.

The embodiments described above efficiently addresses the additional complexity that might arise from, inter alia, the following situations.

Potential temporary capacity problems: When the UPF allocated to a particular PDU entity becomes temporarily congested, its performance might go down and thus it might start to fail to deliver the services with the required low latency or high bandwidth for the PDU entity. While some users might not perceive a degradation of their QoE in these circumstances or might be willing to accept it, others might consider it unacceptable. The embodiments described above provide the necessary flexibility when it comes to deciding which subscribers (and which PDU entities) are affected by the capacity problems.

Insufficiency of conventional control parameters: Though the low latency or high bandwidth characteristics of services provided via PDU entities can be described within QoS profile parameters in a subscription, these parameters currently fail to describe how critical, from the end user or business perspective, they are. As explained above, the UPF allocation handling in regard to a gaming service and a remote surgery service might diverge in certain circumstances, though they would share the same QoS profile. With the technique herein, control information can be evaluated in such situations that enable more fine grained allocation decisions than conventional QoS profiles, in particular based on a combined evaluation of priority information and pre-emption information.

Service independence and isolation: Situations where the operator wants to allocate dedicated UPF resources to specific services and/or subscriber groups, to achieve independence and isolation, can also more efficiently be handled in the embodiments described above. Again, the combined evaluation of priority information and pre-emption information permits to tailor the UPF allocation to the prevailing needs of a network operator.

It will be appreciated that the above embodiments are only of an exemplary nature and do not restrict the scope of the claims appended hereto.

The invention claimed is:

1. An apparatus for user plane function (UPF) allocation; wherein the UPF is configured to provide a Protocol Data Unit (PDU) connectivity service between a terminal device and a data network on a user plane; and wherein the allocation is based on control information associated with an individual logical PDU entity; wherein the control information defines priority information indicative of a priority of the PDU entity relative to other PDU entities; wherein the control information defines pre-emption information indicative of 1) whether the PDU entity is capable of being pre-emptively allocated to a UPF over other PDU entities served by that UPF, and/or 2) whether the PDU entity when served by a UPF is vulnerable to being re-allocated for pre-emptively allocating other PDU entities to that UPF; the apparatus comprising:
processing circuitry;
memory containing instructions executable by the processing circuitry whereby the apparatus is operative to:
detect an event that requires UPF allocation to a first PDU entity;
select a first UPF, wherein the first UPF is serving one or more second PDU entities;
determine, for the selected UPF, insufficient resources for serving the first PDU entity;
perform, responsive to determining the insufficient resources of the selected first UPF, an evaluation of:
first priority information associated with the first PDU entity relative to second priority information associated with the one or more second PDU entities; and
first pre-emption information associated with the first PDU entity and/or second pre-emption information associated with the one or more second PDU entities; and
trigger, dependent on the result of the evaluation, allocation of the first PDU entity to either the first UPF or a second UPF.

2. The apparatus of claim 1, wherein the instructions are such that the apparatus is operative to trigger allocation of the first PDU entity to the second UPF when:
the evaluation of the first and second priority information yields that the first PDU entity has a lower priority than the one or more second PDU entities;
the evaluation of the first pre-emption information yields that the first PDU entity is not capable of being pre-emptively allocated over other PDU entities; and/or
the evaluation of the second pre-emption information yields that the one or more second PDU entities are vulnerable to being re-allocated.

3. The apparatus of claim 1, wherein the instructions are such that the apparatus is operative to trigger allocation of at least one of the one or more second PDU entities to the second UPF or a third UPF when the evaluation yields that the first PDU entity is to be allocated to the first UPF.

4. The apparatus of claim 1, wherein the instructions are such that the apparatus is operative to trigger allocation of the first PDU entity to the first UPF when:
the evaluation of the first and second priority information yields that the first PDU entity has a higher priority than the one or more second PDU entities;
the evaluation of the first pre-emption information yields that the first PDU entity is capable of being pre-emptively allocated over other PDU entities; and/or
the evaluation of the second pre-emption information yields that the one or more second PDU entities are not vulnerable to being re-allocated.

5. The apparatus of claim 1:
wherein the control information associated with the first PDU entity define one or more preferred UPFs including the first UPF; and
wherein the instructions are such that the apparatus is operative to select the first UPF based on the one or more preferred UPFs defined in the control information associated with the first PDU entity.

6. The apparatus of claim 1:
wherein the control information associated with the first PDU entity is devoid of a definition of one or more preferred UPFs; and wherein the instructions are such that the apparatus is operative to select the first UPF based on: UPF load, UPF capacity, UPF location, UPF capability, PDU entity type, PDU entity mode, data network name, subscription profile associated with the terminal device, and/or data routing destination.

7. The apparatus of claim 1, wherein the control information defines a notification requirement when, in case of a re-allocation of a PDU entity from a serving UPF to another UPF, one or more service-related parameters associated with that PDU entity can no longer be fulfilled.

8. The apparatus of claim 1, wherein the detected event is indicative of a need for a UPF de-allocation of the first PDU entity from a serving fourth UPF to a fifth UPF.

9. The apparatus of claim 8, wherein the instructions are such that the apparatus is operative to send a notification message in case the allocation to the fifth UPF results in one or more service-related parameters associated with the first PDU entity no longer being fulfilled.

10. The apparatus of claim 8, wherein the need for the UPF de-allocation is the result of an earlier evaluation resulting in the apparatus having to trigger a de-allocation of the first PDU entity from the fourth UPF so that the fourth UPF can be allocated to a third PDU entity.

11. The apparatus of claim 8, wherein the need for a UPF de-allocation is related to: mobility of the terminal device associated with the first PDU entity, a change of the control information associated with the first PDU entity, a change of a packet error rate associated with the first PDU entity, a change of latency requirements for the first PDU entity, and/or a change of bandwidth requirements for the first PDU entity.

12. The apparatus of claim 1, wherein the detected event is indicative of establishment of the first PDU entity.

13. The apparatus of claim 1, wherein the instructions are such that the apparatus is operative to receive the control information associated with the first PDU entity.

14. The apparatus of claim 1, wherein the apparatus is configured to implement the UPF allocation as part of a Session Management Function.

15. An apparatus for controlling user plane function (UPF) allocation, wherein the UPF is configured to provide a Protocol Data Unit (PDU) connectivity service between a terminal device and a data network on a user plane, and wherein the allocation is based on control information associated with an individual logical PDU entity; wherein the control information defines priority information indicative of a priority of the PDU entity relative to other PDU entities; wherein the control information defines pre-emption information indicative of: 1) whether the PDU entity is capable of being pre-emptively allocated to a UPF over other PDU entities served by that UPF, and/or 2) whether the PDU entity when served by a UPF is vulnerable to being re-allocated for pre-emptively allocating other PDU entities to that UPF; the apparatus comprising:
  processing circuitry;
  memory containing instructions executable by the processing circuitry whereby the apparatus is operative to:
    detect an event that requires transmission of control information associated with a PDU entity to facilitate an allocation of the PDU entity to a UPF;
    obtain the control information associated with the PDU entity; and
    transmit the control information for PDU entity allocation.

16. The apparatus of claim 15, wherein the instructions are such that the apparatus is operative to:
  implement the UPF allocation control as part of a Policy Control Function; and
  transmit the control information over an N7 interface or an Npcf service interface to a session management function.

17. The apparatus of claim 15, wherein the instructions are such that the apparatus is operative to:
  implement the UPF allocation control as part of a unified data management function; and
  transmit the control information over an N10 interface or an Nudm service interface to a session management function.

18. The apparatus of claim 15, wherein the event that requires transmission of control information for the PDU entity is: an establishment of the PDU entity, a modification of control information associated with the PDU entity, or a reception of a notification form an application function AF.

19. A method for user plane function (UPF) allocation, wherein the UPF is configured to provide a Protocol Data Unit (PDU) connectivity service between a terminal device and a data network on a user plane, and wherein the allocation is based on control information associated with an individual logical PDU entity; wherein the control information defines priority information indicative of a priority of the PDU entity relative to other PDU entities; wherein the control information defines pre-emption information indicative of: 1) whether the PDU entity is capable of being pre-emptively allocated to a UPF over other PDU entities served by that UPF, and/or 2) whether the PDU entity when served by a UPF is vulnerable to being re-allocated for pre-emptively allocating other PDU entities to that UPF; the method comprising:
  detecting an event that requires UPF allocation to a first PDU entity;
  selecting a first UPF, wherein the first UPF is serving one or more second PDU entities;
  determining, for the selected UPF, insufficient resources for serving the first PDU entity;
  performing, responsive to determining the insufficient resources of the selected first UPF, an evaluation of:
    first priority information associated with the first PDU entity relative to second priority information associated with the one or more second PDU entities; and
    first pre-emption information associated with the first PDU entity and/or second pre-emption information associated with the one or more second PDU entities; and
  triggering, dependent on the result of the evaluation, allocation of the first PDU entity to either the first UPF or a second UPF.

20. A method for controlling user plane function (UPF) allocation; wherein the UPF is configured to provide a Protocol Data Unit (PDU) connectivity service between a terminal device and a data network on a user plane; wherein the allocation is based on control information associated with an individual logical PDU entity; wherein the control information defines priority information indicative of a priority of the PDU entity relative to other PDU entities; wherein the control information defines pre-emption information indicative of: 1) whether the PDU entity is capable of being pre-emptively allocated to a UPF over other PDU entities served by that UPF, and/or 2) whether the PDU entity when served by a UPF is vulnerable to being re-allocated for pre-emptively allocating other PDU entities to that UPF; the method comprising:

detecting an event that requires transmission of control information associated with a PDU entity to facilitate an allocation of the PDU entity to a UPF;
obtaining the control information associated with the PDU entity; and
transmitting the control information for PDU entity allocation.

* * * * *